US009020729B2

(12) United States Patent
Maitlen

(10) Patent No.: US 9,020,729 B2
(45) Date of Patent: Apr. 28, 2015

(54) INTEGRATED TRAILER BRAKE CONTROL SYSTEM AND METHOD USING A LEARNED RELATIONSHIP

(71) Applicant: Robert Bosch GmbH, Stuttgart (DE)

(72) Inventor: Daniel Sigfus Maitlen, Farmington Hills, MI (US)

(73) Assignee: Robert Bosch GmbH, Stuttgart (DE)

( * ) Notice: Subject to any disclaimer, the term of this patent is extended or adjusted under 35 U.S.C. 154(b) by 24 days.

(21) Appl. No.: 13/964,653

(22) Filed: Aug. 12, 2013

(65) Prior Publication Data

US 2014/0046565 A1    Feb. 13, 2014

Related U.S. Application Data

(60) Provisional application No. 61/681,852, filed on Aug. 10, 2012, provisional application No. 61/711,274, filed on Oct. 9, 2012.

(51) Int. Cl.
*B60T 8/17* (2006.01)
*B60T 8/32* (2006.01)
*B60T 8/172* (2006.01)

(52) U.S. Cl.
CPC ............. *B60T 8/1701* (2013.01); *B60T 8/321* (2013.01); *B60T 8/1708* (2013.01); *B60T 8/172* (2013.01); *B60T 2201/04* (2013.01)

(58) Field of Classification Search
CPC ..... B60T 8/1701; B60T 8/321; B60T 8/1708; B60T 8/172; B60T 2201/04
USPC .................. 701/70, 78; 303/3, 7, 15, 20, 123; 180/14.2, 14.6
See application file for complete search history.

(56) References Cited

U.S. PATENT DOCUMENTS 4,616,881 A  * 10/1986 Muller et al. ..................... 303/7
6,039,410 A     3/2000 Robertson et al.
(Continued)

FOREIGN PATENT DOCUMENTS

CA     2363427 A1  *  5/2002
DE     4429231         8/1995
(Continued)

OTHER PUBLICATIONS

TruControl Brake Controller, Hensley Hitch Towable Products, Oct. 9, 2012, Retrieved from Internet <URL: http://hensleymfg.com/faq/trucontrol-brake-controller/> 5 pages.
(Continued)

*Primary Examiner* — Mary Cheung
*Assistant Examiner* — Rodney Butler
(74) *Attorney, Agent, or Firm* — Michael Best & Friedrich LLP

(57) ABSTRACT

A trailer brake control method for a vehicle towing a trailer. The method may include determining a number (N) of vehicle operating points during a first braking event when the vehicle is not towing the trailer by determining N brake operating points; determining an acceleration operating point for each of the N brake operating points; and determining a first relationship between brake pressure and vehicle acceleration based on the N vehicle operating points. The method also includes determining a number (M) of vehicle operating points during a second braking event when the vehicle is towing the trailer; determining a current brake operating point; and determining a trailer brake command signal based on at least the first relationship, the M vehicle operating points, and the current brake operating point.

19 Claims, 16 Drawing Sheets

(56) References Cited

U.S. PATENT DOCUMENTS

| | | | |
|---|---|---|---|
| 6,273,522 B1 * | 8/2001 | Feetenby et al. | 303/7 |
| 6,966,613 B2 | 11/2005 | Davis | |
| 7,204,564 B2 | 4/2007 | Brown et al. | |
| 7,347,507 B1 | 3/2008 | Stillinger | |
| 7,731,302 B2 | 6/2010 | Tandy, Jr. et al. | |
| 8,068,019 B2 | 11/2011 | Bennie et al. | |
| 8,112,212 B2 * | 2/2012 | Bauerle | 701/70 |
| 2004/0119334 A1 | 6/2004 | Lenz et al. | |
| 2006/0076827 A1 | 4/2006 | Albright et al. | |
| 2007/0001509 A1 | 1/2007 | Brown et al. | |
| 2008/0177454 A1 | 7/2008 | Bond et al. | |
| 2009/0082935 A1 * | 3/2009 | Leschuk et al. | 701/70 |
| 2009/0204303 A1 | 8/2009 | Leschuk et al. | |
| 2010/0237690 A1 | 9/2010 | Forster et al. | |

FOREIGN PATENT DOCUMENTS

| | | |
|---|---|---|
| DE | 19519768 | 12/1996 |
| EP | 603493 A2 * | 6/1994 |
| EP | 1433681 | 6/2004 |
| JP | 10236299 | 9/1998 |

OTHER PUBLICATIONS

TruControl Gold, Owner's Manual, Hensley Mfg., Inc., 7 pages.
International Search Report and Written Opinion for Application No. PCT/US2013/054520 dated Oct. 15, 2013 (10 pages).
United States Patent Office Action for U.S. Appl. No. 13/964,661 dated Jan. 14, 2015 (9 pages).

* cited by examiner

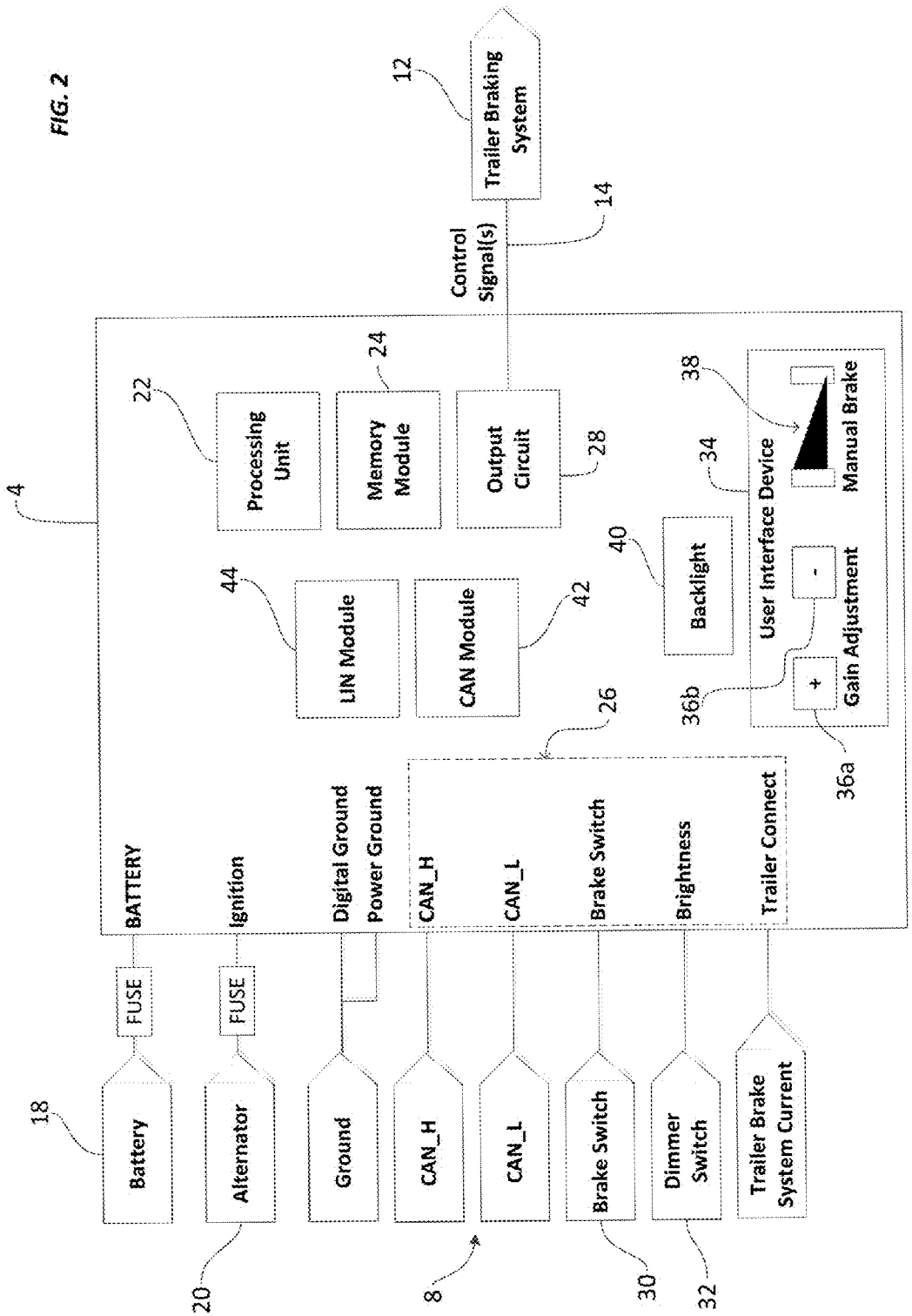

INTEGRATED TRAILER BRAKE CONTROL SYSTEM AND METHOD USING A LEARNED RELATIONSHIP

RELATED APPLICATIONS

The present application claims priority to U.S. Provisional Application No. 61/681,852, filed Aug. 10, 2012, and U.S. Provisional Application No. 61/711,274, filed Oct. 9, 2012. The entire contents of both provisional applications are hereby incorporated by reference.

FIELD

Embodiments of the invention relate to systems and methods for controlling a braking system of a vehicle trailer.

BACKGROUND

When a vehicle is towing a trailer, the added weight and brake force of the trailer (especially if the trailer is on an inclined surface) impacts the braking performance of the vehicle. For example, braking used to decelerate a vehicle when the vehicle is not towing a trailer may not be sufficient to decelerate the vehicle by the same amount when the vehicle is towing a trailer. This situation can occur even when separate brakes are used on the trailer. Accordingly, it can be difficult for an operator to adjust to the impact of the trailer on braking performance, which can create uncomfortable and potentially unsafe driving conditions.

SUMMARY

Accordingly, in one embodiment, the invention provides a trailer brake controller that learns a relationship between vehicle brake system pressure and vehicle acceleration when the vehicle is not towing a trailer. When the vehicle is towing a trailer, the trailer brake controller operates the brakes of the trailer to maintain the same relationship despite the additional mass and brake force of the trailer. In some embodiments, the trailer brake controller also enables a driver to manually set a braking level of the trailer brakes through a user interface device. The user interface device can include one or more buttons and/or levers.

In another embodiment, the invention provides a trailer brake control method for a vehicle towing a trailer. The method includes determining a number (N) of vehicle operating points during a first braking event when the vehicle is not towing the trailer by determining, based on information from a brake sensor, N brake operating points, and determining, based on information from one of a speed sensor and an acceleration sensor, an acceleration operating point for each of the N brake operating points. Using a processing unit, a first relationship between brake pressure and vehicle acceleration based on the N vehicle operating points is determined. The method also includes determining a number (M) of vehicle operating points during a second braking event when the vehicle is towing the trailer by, determining, based on information from the brake sensor, M brake operating points, and determining, based on information from the one of the speed sensor and the acceleration sensor, an acceleration operating point at each of the M brake operating points. Based on information from the brake sensor, a current brake operating point is determined. Using the processing unit, a trailer brake command signal is determined based on at least the first relationship, the M vehicle operating points, and the current brake operating point. The brakes of the trailer are controlled by transmitting the trailer brake command signal from the vehicle to the trailer.

In some embodiments, the number (N) of vehicle operating points during a first braking event is a predetermined number. The number (M) of vehicle operating points during a second braking event may also be predetermined number The method my also include determining, using the processing unit, a number (P) of differences between the M vehicle operating points and the N vehicle operating points; and determining the trailer brake command signal based on the P differences.

In certain embodiments, the method also includes storing the first relationship in a memory module; determining a sum of the P differences; and when the sum is greater than a predetermined sum, determining, using the processing unit, a second relationship between driver brake pressure and vehicle acceleration based on the M vehicle operating points, overwriting the first relationship in the memory module with the second relationship, and determining the trailer brake command signal based on the second relationship.

The method may include storing the first relationship in a memory module; determining a sum of the P differences; determining an average difference by dividing the sum by P; and when the average difference is greater than a predetermined difference, determining, using the processing unit, a second relationship between driver brake pressure and vehicle acceleration based on the M vehicle operating points, overwriting the first relationship in the memory module with the second relationship, and determining the trailer brake command signal based on the second relationship.

Determining the first relationship may include determining a curve having a fit to the N vehicle operating points. Determining the first relationship may also include determining an Nth order curve having a fit to the N vehicle operating points, wherein N is an even integer greater than 2.

Determining the trailer brake command signal may include determining a difference between each of P of the M vehicle operating points and the curve, P being an integer less than or equal to M. Determining the trailer brake command signal may include determining a gain amount based on the P differences; and determining a product by multiplying the gain by the current brake operating point.

Determining the gain amount based on the P differences may include determining a difference control value based on the P differences; and accessing a look-up table mapping the difference control value to the gain amount.

Determining the trailer brake command signal may include (1) dividing the current brake operating point by a maximum brake operating point and (2) multiplying the result of step (1) by the gain amount.

In some embodiments, the trailer brake control method includes determining, using a wheel speed sensor, an estimated acceleration operating point by determining a derivative of an output of the wheel speed sensor; measuring, using an accelerometer, a current acceleration operating point; and determining a difference between the estimated acceleration operating point and the current acceleration operating point. Determining the trailer brake command signal may include determining a difference level based on the difference and a plurality of predetermined acceleration ranges.

The trailer brake control method may also include determining a coefficient of friction and adjusting the trailer brake command signal based on the coefficient of friction.

A minimum trailer brake control value may be determined based on a current vehicle speed and setting the trailer brake command to the minimum trailer brake control value when the trailer brake command is less than the minimum trailer brake control value.

A manual trailer brake command may be determined based on a manually-selected gain amount input by an operator. The control method may include setting the trailer brake command to the manual trail brake command when the manual trailer brake command is greater than the trailer brake command.

The trailer brake control method may include determining the first relationship by selecting a subset of the N vehicle operating points and the curve may be second order curve.

In addition, the trailer brake control method may include determining, based on information from the brake sensor and the speed sensor, a number N' of vehicle operating points during a third braking event when the vehicle is not towing the trailer, and determining the first relationship may include determining the first relationship based on the N' vehicle operating points.

In another embodiment, the invention provides a trailer brake control method that includes determining, based on information from a vehicle speed sensor, a current vehicle speed of a vehicle. The method also includes determining, regardless of the current vehicle speed, using a processing unit, a minimum trailer brake control value (MTBCV) based on the equation MTBCV=R1−Cth root (the current vehicle speed)/R2, wherein the minimum trailer brake control value corresponds to a minimum braking force at the current vehicle speed, R1 is a real number less than 1.0, C is an integer greater than 2, and R2 is a real number greater than 1.0. A trailer brake command is determined using the processing unit, based on the minimum trailer brake control value. The method includes operating the brakes of a trailer connected to the vehicle at or above the minimum braking force by transmitting the trailer brake command signal from the vehicle to a trailer.

The trailer brake control method may also include determining the minimum trailer brake controller value when R1 is approximately 0.5 and R2 is approximately 4.0.

Generating the trailer brake command signal may be based on a gain amount, a current brake pressure of the vehicle, and a maximum brake pressure.

Determining the trailer brake command signal based on the minimum trailer brake control value may include setting the trailer brake command signal to the minimum trailer brake control value when the trailer brake command is less than the minimum trailer brake control value.

The trailer brake control method may include determining a coefficient of friction; determining a maximum trailer brake control value based on the coefficient of friction; and setting the trailer brake command signal to the maximum trailer brake control value when the trailer brake command is greater than the maximum trailer brake control value.

In some embodiments, C is equal to 3.

In an alternative embodiment, the invention provides a trailer brake controller that includes a processing unit configured to determine a current vehicle speed of a vehicle and, regardless of the current vehicle speed, determine a minimum trailer brake control value (MTBCV) based on the equation MTBCV=R1−cube root (the current vehicle speed)/R2, wherein the minimum trailer brake control value corresponds to a minimum braking force at the current vehicle speed, R1 is a real number less than 1.0 and R2 is a real number greater than 1.0. The controller generates a trailer brake command signal based on the minimum trailer brake control value, and sends the signal to the brakes of a trailer connected to the vehicle so that the brakes operate at or above the minimum braking force by transmitting the trailer brake command signal from the vehicle to the trailer.

In some embodiments, R1 is approximately 0.5 and R2 is approximately 4.0.

In some embodiments, the processing unit is further configured to generate the trailer brake command signal based on a gain amount, a current brake pressure of the vehicle, and a maximum brake pressure. The processing unit may also be configured to determine the trailer brake command signal based on the minimum trailer brake control value by setting the trailer brake command signal to the minimum trailer brake control value when the trailer brake command is less than the minimum trailer brake control value. The processing unit may also be configured to determine a coefficient of friction; determine a maximum trailer brake control value based on the coefficient of friction; and set the trailer brake command signal to the maximum trailer brake control value when the trailer brake command is greater than the maximum trailer brake control value.

Other aspects of the invention will become apparent by consideration of the detailed description and accompanying drawings.

BRIEF DESCRIPTION OF THE DRAWINGS

FIG. 2 schematically illustrates the trailer brake controller of FIG. 1.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
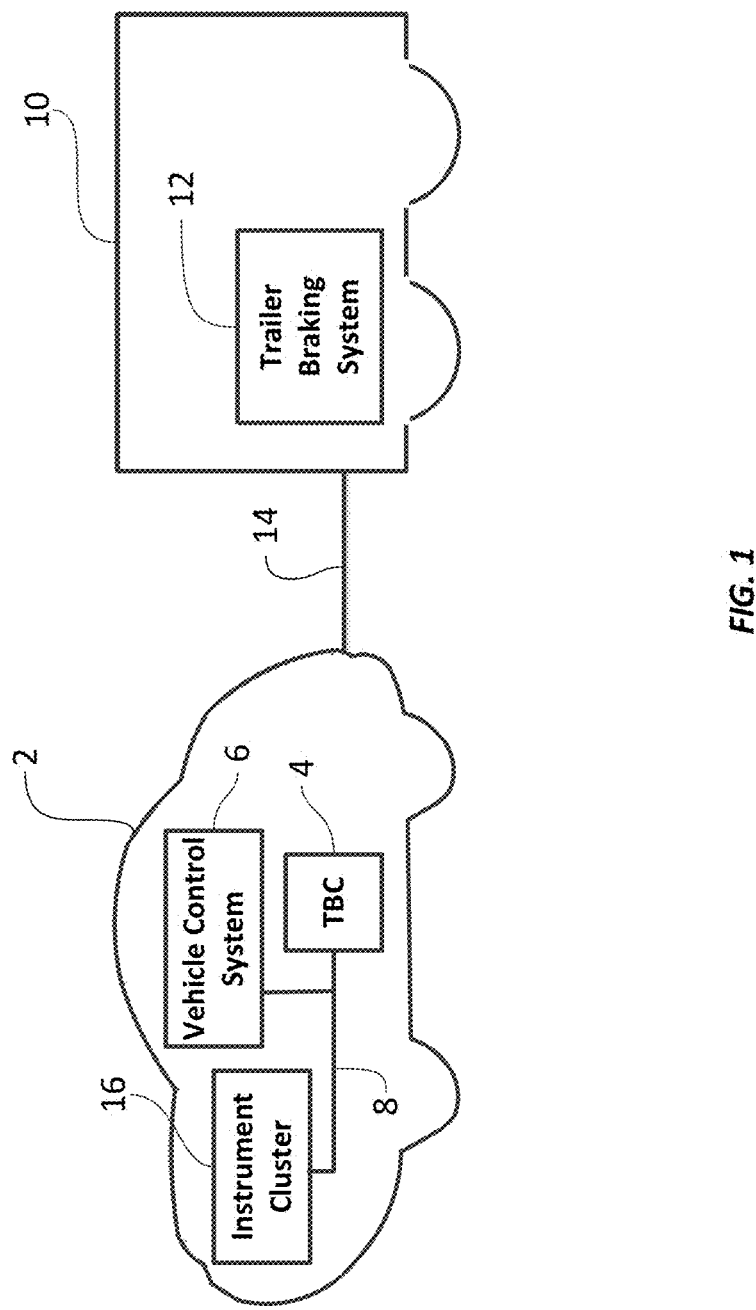
FIG. 1 schematically illustrates a vehicle including a trailer brake controller.

FIG. 1 illustrates a vehicle 2. In various embodiments, the vehicle 2 is a passenger car or truck, commercial vehicle, or other multi-wheeled vehicle. A trailer brake controller ("TBC") 4 is installed in the vehicle 2 (e.g., in a dashboard area of the vehicle 2) and communicates with at least one vehicle control system 6 also included in the vehicle 2. The TBC 4 communicates with the vehicle control system 6 over at least one communication network, such as a controller area network ("CAN") bus 8, a local interconnect network ("LIN") bus, an Ethernet connection, or other communication network. Alternatively, in some embodiments, the TBC 4 is integrated with the vehicle control system 6.

The vehicle control system 6 can include a chassis control system. For example, in some embodiments, the control system 6 includes a vehicle stability control ("VSC") system. As is known in the automotive industry, the VSC system improves a vehicle's stability by detecting and reducing loss of traction or steering control. Accordingly, the vehicle stability control system monitors various vehicle conditions, such as wheel speed and brake pressure, to determine when vehicle control is necessary. Therefore, the TBC 4 can receive inputs from the vehicle stability control system including wheel speed, brake pressure, and/or VSC fault information. The wheel speed can be sensed with one of a number of wheel speed sensors.

When the vehicle 2 is connected to a trailer 10, the TBC 4 also communicates with a trailer braking system 12 included in the trailer 10. The TBC 4 communicates with the trailer braking system 12 over a trailer connection 14. The trailer braking system 12 can include an electrical braking system, a hydraulic braking system, or a combination thereof. As described in more detail below, the TBC 4 outputs control or command signals to the trailer braking system 12. The command signals instruct or control the trailer braking system 12 to apply a particular amount of braking to the trailer 10.

In some embodiments, the TBC 4 also outputs status information to an instrument cluster 16 included in the vehicle 2 (e.g., in a dashboard area of the vehicle 2). The status information can include information regarding whether the trailer 10 is connected to the vehicle 2, whether the trailer braking system 12 is currently braking the trailer 10, a brake command (e.g., level or output), an error or fault condition, etc. The instrument cluster 16 displays information to an occupant in the vehicle 2 based on the received status information. The instrument cluster 16 can display information visually, audibly, or by a combination thereof (e.g., through one or more lights and/or messages).

FIG. 2 schematically illustrates the TBC 4 according to one embodiment of the invention. As illustrated in FIG. 2, the TBC 4 receives power from one or more power sources, such as a battery 18 and/or an electromechanical power source, such as an alternator 20, included in the vehicle 2. The TBC 4 includes a processing unit 22 (e.g., a microprocessor, an application specific integrated circuit ("ASIC"), etc.), one or more memory modules 24, a plurality of input ports 26, and at least one output port or circuit 28. The memory modules 24 includes non-transitory computer-readable medium, such as random-access memory ("RAM"), read-only memory ("ROM"), and/or electrically erasable programmable read-only memory ("EEPROM"). The processing unit 22 retrieves instructions from the memory modules 24 and executes the instructions to perform particular functions. The processing unit 22 can also retrieve and store data to the memory modules 24 as part of executing the instructions.

In addition, the processing unit 22 receives data from external devices and systems through the input ports 26. For example, as illustrated in FIG. 1, the input ports 26 can receive data from the CAN bus 8. As noted above, the CAN bus 8 connects the TBC 4 to vehicle control systems 6 included in the vehicle 2. Optionally, the processing unit 22 also receives data from a brake switch 30 and/or a dimmer switch 32 through the input ports 26. The processing unit 22 can be configured to use data from the brake switch 30 to determine when the driver is applying the vehicle's brakes. In other embodiments, the processing unit 22 uses a measured brake pressure amount to infer when the driver is applying the brakes. The dimmer switch 32 allows an operator to change the brightness of the instrument cluster 16. As described in more detail below, the signal received from the dimmer switch 32 can be used to set a brightness of a user interface device included in the TBC 4.

In some embodiments, the processing unit 22 also receives data from the trailer braking system 12 through the input ports 26. For example, the processing unit 22 can receive data from the trailer braking system 12 over an analog interface that indicates whether the trailer 10 is attached to the vehicle 2. In particular, when the trailer 10 is attached to the vehicle 2, the TBC 4 detects a high current or load on this input port. Alternatively, when the trailer 10 is not attached to the vehicle 2, the TBC 4 detects a low current or load.

It should be understood that in some embodiments, one or more of the input ports can also be used as an output port. For example, in some embodiments, the processing unit 22 can output data over the CAN bus 8 in addition to reading data from the CAN bus 8. In this situation, the input ports associated with the CAN bus 8 can be configured to receive and write data to the CAN bus 8.

The processing unit 22 can also output data to external devices and systems through the output circuit 28. For example, as noted above, the processing unit 22 can output command signals to the trailer braking system 12 using the output circuit 28. The output circuit 28 can be configured to process and condition a signal output from the processing unit 22 for transmission to the trailer braking system 12 over the trailer connection 14. It should be understood, however, that in some embodiments, the functionality of the output circuit 28 is performed by the processing unit 22 or elsewhere (e.g., a separate component of the vehicle 2 and/or the trailer 10).

As illustrated in FIG. 2, the TBC 4 also includes a user interface device 34. The user interface device 34 allows a user (e.g., the driver of the vehicle 2) to configure the TBC 4 through a digital and/or an analog interface. For example, the user interface device 34 can include one or more buttons, knobs, or switches for adjusting a gain value or adjustment applied by the TBC 4. In particular, the user interface device 34 can include an increase gain button 36a and a decrease gain adjustment button 36b. The user interface device 34 can also include a manual brake lever or slider 38 for adjusting a braking level applied by the trailer braking system 12. The brake lever 38 can be used to set a preferred braking level (e.g., aggressive). The gain value adjusts braking force around the preferred braking level. In some embodiments, TBC 4 also includes a backlight 40 for lighting at least a portion of the user interface device 34. As noted above, an amount of backlighting provided by the backlight 40 can be based on a signal received from the dimmer switch 32.

The TBC 4 also includes at least one communication module. The communication module is configured to exchange data with systems and networks external to the TBC 4. For example, as illustrated in FIG. 2, the TBC 4 can include a CAN module 42 and a local interconnect network ("LIN") module 44. The CAN module 42 allows the TCB 4 to communicate with external devices and system over the CAN bus 8. The LIN module 44 allows the TCB 4 to communicate with external devices and systems using the LIN protocol. In particular, the modules 42 and 44 convert data received from external devices or systems according to a particular communication protocol to a format recognizable by the processing unit 22. Similarly, the modules 42 and 44 can convert data output from the processing unit 22 accordingly to a particular communication protocol (e.g., CAN or LIN). It should be understood that the TCB 4 can include communication modules for message-based and/or serial protocols other than CAN and LIN in addition to or as an alternative to the modules 42 and 44. Also, in some embodiments, the functionality performed by the communication modules can be performed by the processing unit 22. In addition, in some embodiments, the TBC 4 only includes one communication module, such as the CAN module 42.

The instructions executed by the processing unit 22 control the braking force applied by the trailer braking system 12. In particular, as described in more detail below, the TBC 4 receives various inputs through the input ports 26 and generates command signals for operating the trailer braking system 12 based on the inputs. To improve the consistency of operation and control of the vehicle 2 for a driver when the vehicle 2 is towing the trailer 10, the TBC 4 observes actual vehicle performance when the vehicle 2 operates without the trailer 10. In particular, the TBC 4 determines a relationship between vehicle brake system pressure and vehicle acceleration (including negative vehicle acceleration sometimes referred to as deceleration) based on the observed vehicle performance. When the trailer 10 is attached to and towed by the vehicle 2, the TBC 4 uses the learned relationship to adjust the braking performed by the trailer braking system 12 to make performance of the vehicle 2 when the trailer 10 is attached similar to performance of the vehicle 2 when the trailer 10 is not attached.

Figure 3A:
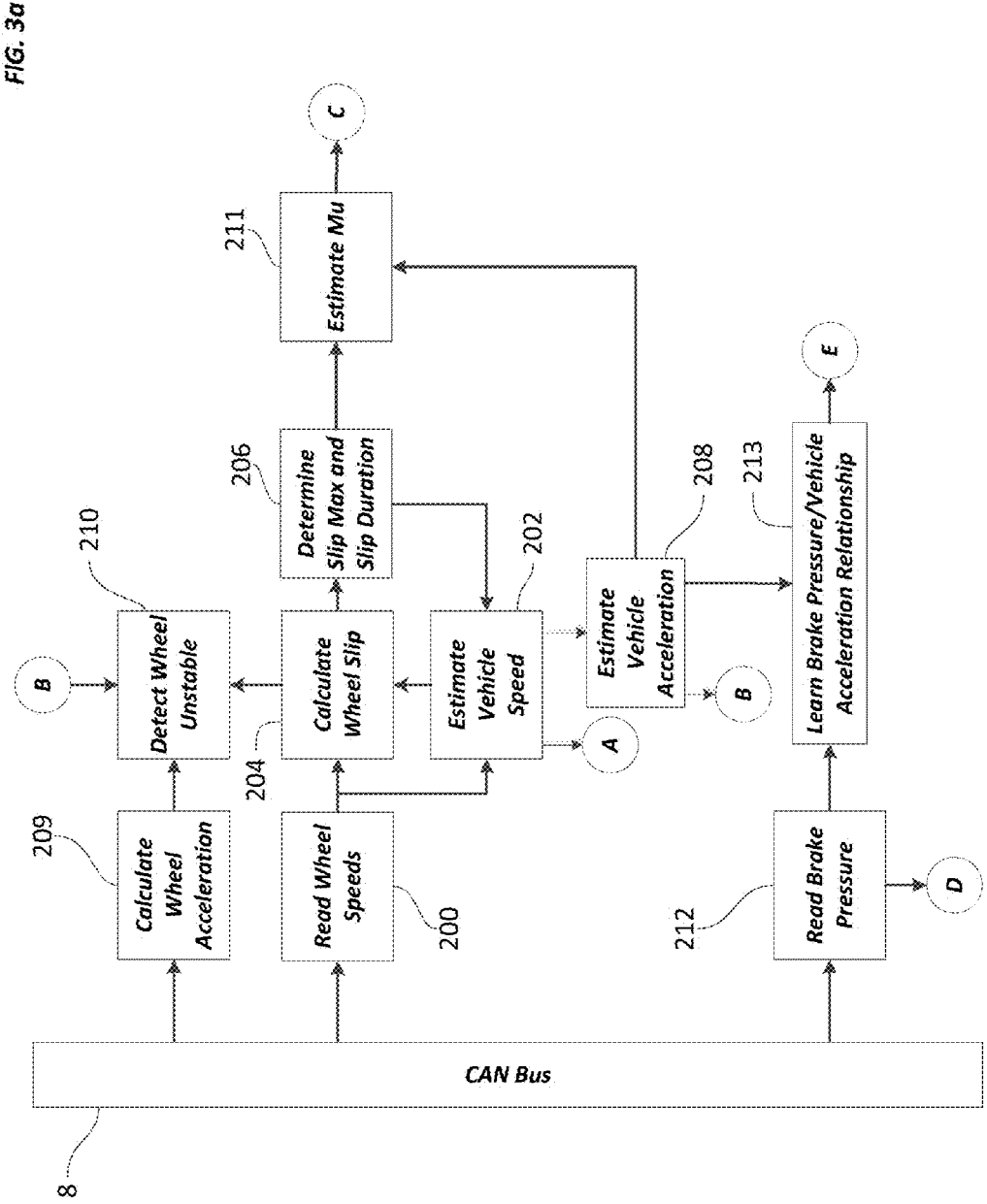
FIGS. 3a-c are flowcharts illustrating a method of controlling the brakes of a trailer using the trailer brake controller of FIG. 1.
Figure 3B:
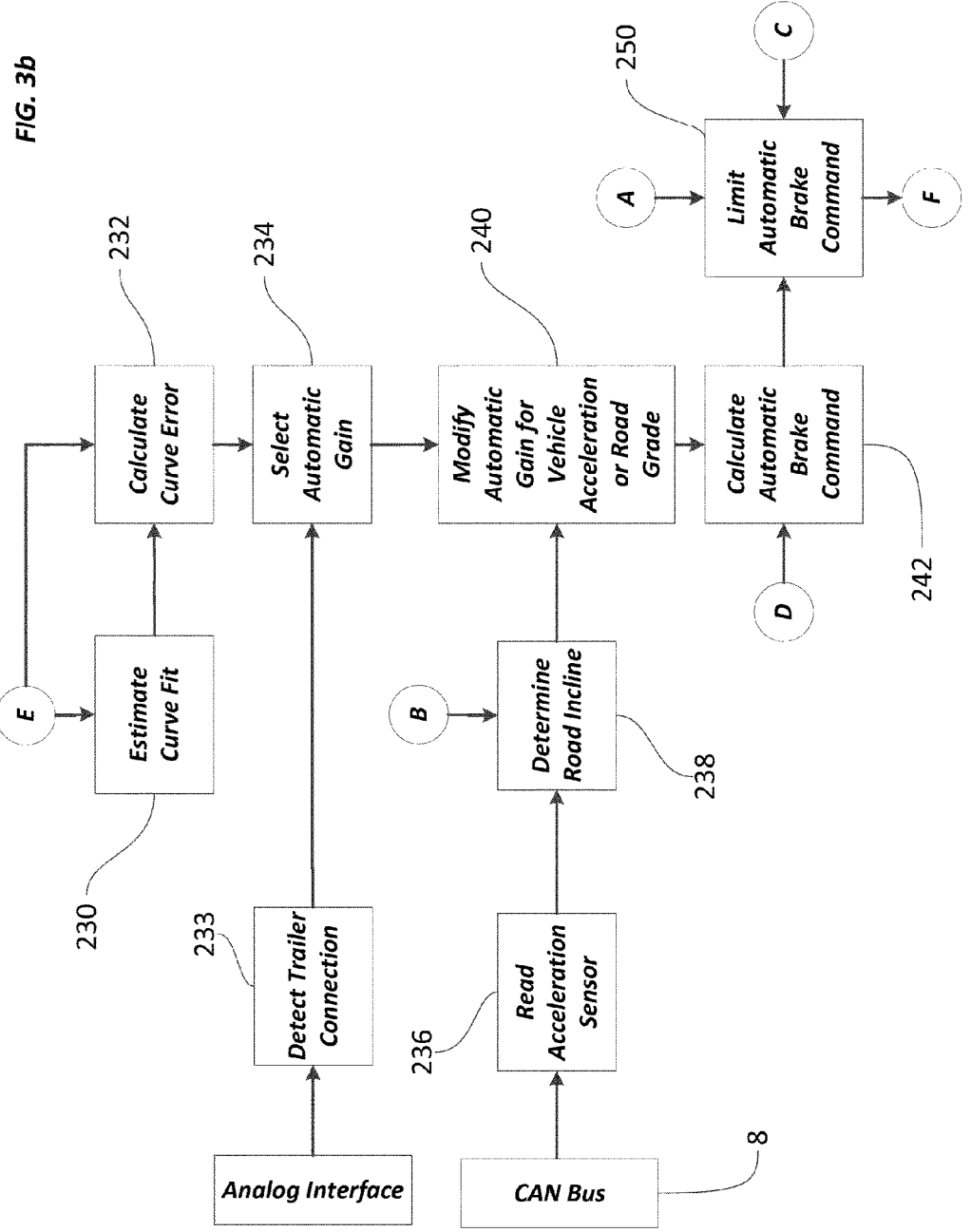
Figure 3C:
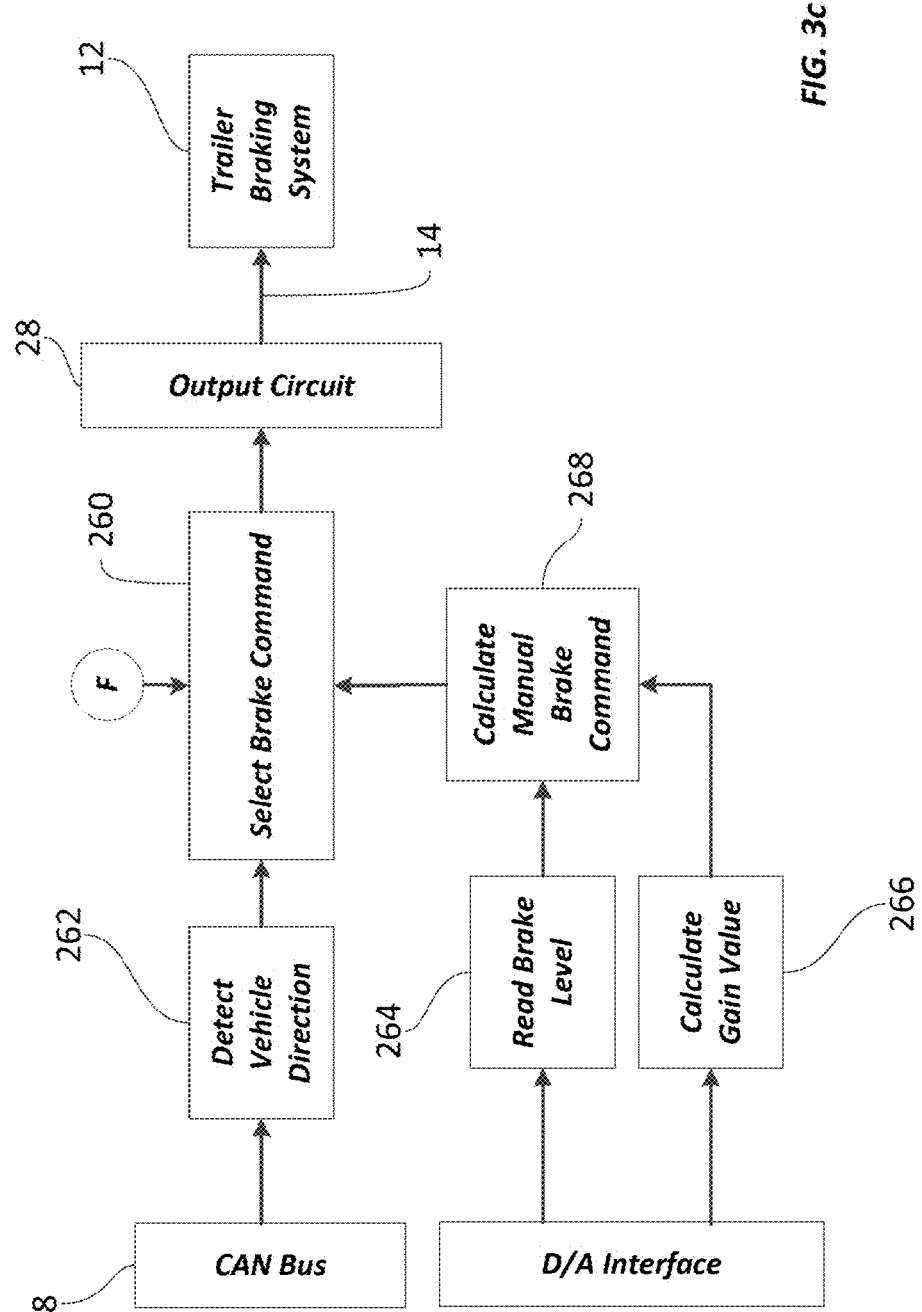

For example, FIGS. 3a-c illustrate a brake control method performed by the TBC 4. As illustrated in FIG. 3a, the TBC 4 obtains current wheel speeds from the CAN bus 8 (at block 200). The TBC 4 uses the received wheel speeds to estimate a vehicle speed (at block 202). The TBC 4 also uses the current wheel speeds and the estimated vehicle speed to calculate a wheel slip (at block 204). The TBC 4 uses the calculated wheel slip to determine a maximum slip amount and a slip duration (at block 206). As illustrated in FIG. 3a, the TBC 4 uses the maximum slip amount and the slip duration when estimating the vehicle speed (at block 202) and uses the estimated vehicle speed to estimate vehicle acceleration (at block 208).

It should be understood that other mechanisms for determining vehicle speed may be used. For example, in addition to or instead of wheel sensors, other speed sensors including drivetrain rotational sensors can be used. Optical and radar sensors may also be used to determine vehicle speed.

The TBC 4 also calculates wheel acceleration (at block 209) based on wheel speed data read from the CAN bus 8. The TBC 4 uses the wheel acceleration and the calculated wheel slip to detect unstable vehicle wheels (at block 210). An unstable wheel condition indicates that the wheel is close to a lock-up or skid situation (i.e., the wheel has reached peak coefficient of friction for a given road surface). Based on the maximum slip amount and the slip duration (at block 206) and the estimated vehicle acceleration (at block 208), the TBC 4 also estimates a coefficient of friction (i.e., a "mu" value) between the wheels of the vehicle 2 and the surface the vehicle 2 is driving on (at block 211). As described below in more detail, the TBC 4 uses the coefficient of friction to adjust or limit command signals provided to the trailer braking system 12 to help keep the trailer 10 stable on slippery surfaces, such as ice or snow.

It should be understood that the TBC 4 can use existing methods for determining the coefficient of friction. Also, it should be understood that the TBC 4 can be configured to filter, adjust, or otherwise condition raw data obtained over the CAN bus 8.

Further still, although acceleration can be determined from wheel speed, determining acceleration in this manner or through acceleration sensors may be viewed as simply using an acceleration sensor to determine acceleration.

In addition to calculating or estimating vehicle acceleration (sometimes referred to herein as an acceleration operating point) and a coefficient of friction, the TBC 4 also reads a braking operating point from the CAN bus 8 (at block 212). The braking operating point is a measurement of driver braking intent. For example, as compared to a modulated braking amount determined by a vehicle control system, such as an automatic braking system, the driver braking intent represents an amount of braking requested by the driver through application of the vehicle's brake pedal. The braking operating point can be a pressure amount generated by the driver at the master cylinder or a travel amount of the brake pedal. Accordingly, the TBC 4 can be configured to read a braking operating point from a pressure sensor associated with the master cylinder or from a position sensor associated with the brake pedal.

Figure 4:
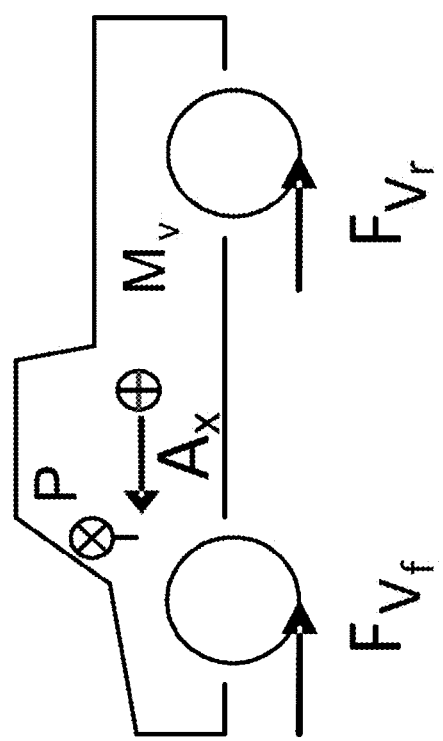
FIG. 4 is a free body diagram illustrates a stopping force for a vehicle not towing a trailer.
Figure 5:
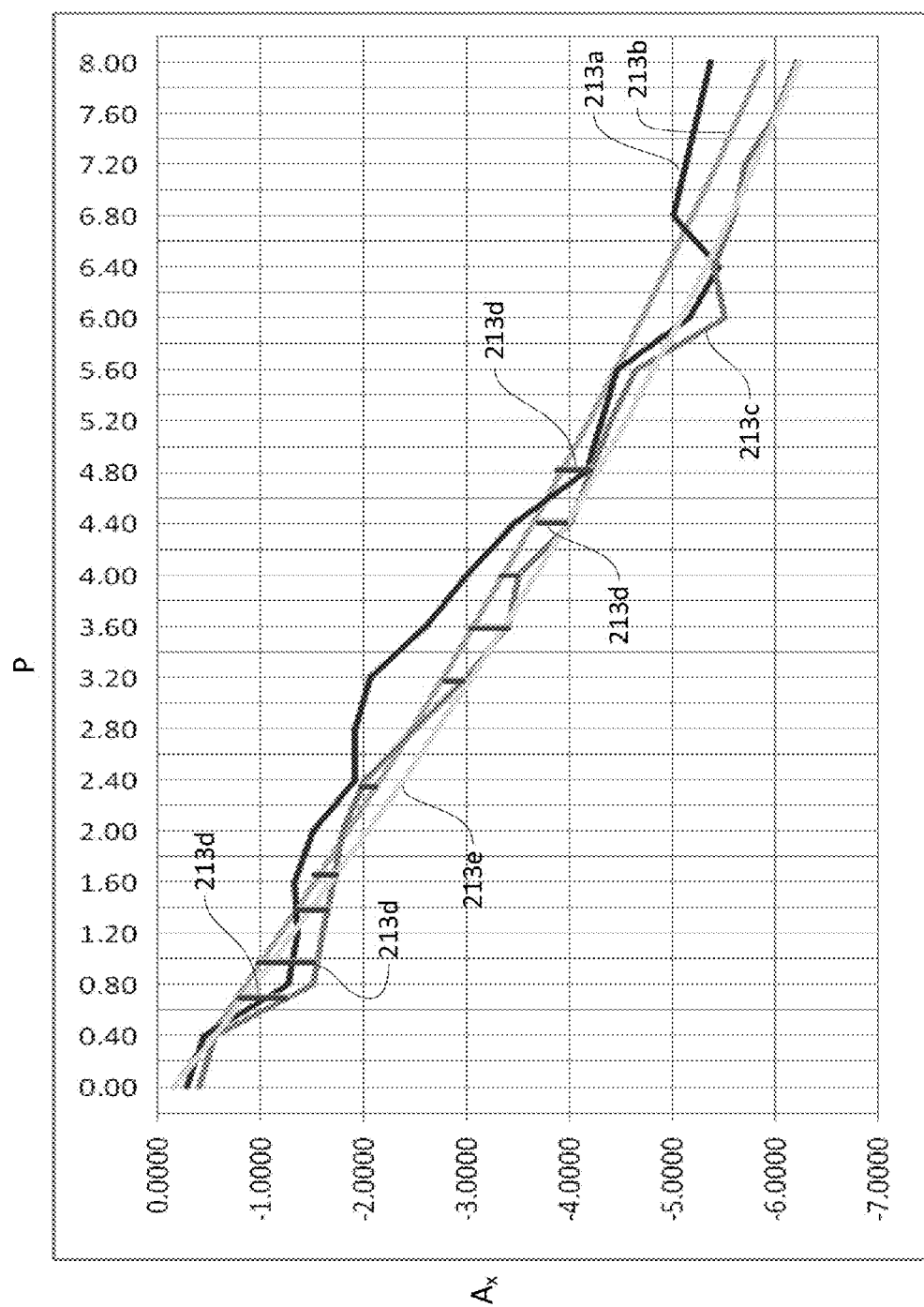
FIG. 5 is a graph illustrating a measured relationship between vehicle acceleration and pressure.

The TBC 4 uses the acceleration operating point and the braking operating point to learn a relationship between brake pressure and vehicle acceleration (at block 213). In particular, as illustrated in FIG. 4, the force ($F_{v_f} + F_{v_r}$) used to stop a vehicle mass ($M_v$) is generated by the vehicle's braking system. The brakes are actuated through hydraulic fluid applied by the driver's foot (i.e., through pressure from a brake pedal). As noted above, the pressure (P or brake operating point) of the hydraulic fluid can be measured using a pressure sensor (see block 212 above). The stopping force ($F_{v_f} + F_{v_r}$) is also related to vehicle deceleration ($A_x$ or acceleration operating point), which can also be estimated (see block 208 above) or measured directly using an accelerometer. Because the pressure and the deceleration relate to the stopping force, they can be plotted against each other to describe a relationship. For example, an example relationship between $A_x$ (estimated at block 208) and P (read at block 212) observed by the TBC 4 is illustrated in FIG. 5 by line 213a.

A number of factors (e.g., vehicle vibration, poor road surface, electrical interference, sensor resolution, etc.) can contribute noise to the measurements of $A_x$ and P. However, when a curve fit is applied, a general trend in the data can be identified. Also, as is known from vehicle dynamics, the nature of the pressure/acceleration relationship is a second order relationship. Therefore, a second order curve fit or line can be applied to the measured relationship between $A_x$ and P to eliminate noise and other unwanted factors from the relationship. Line 213b illustrated in FIG. 5 represents the curve fit for the measured relationship represented by line 213a. Therefore, line 213b represents the idealized relationship of driver input to vehicle deceleration.

Accordingly, while the vehicle 2 is driven without the trailer 10, the TBC 4 estimates the $A_x$ values (at block 208) for a given P value (at block 212) to learn the relationship between $A_x$ and P (at block 213) and generate a curve fit for the learned relationship (at block 230). If, while the vehicle 2 is driven without the trailer 10, a predetermined number of $A_x$ readings for a given P (hereinafter referred to as "vehicle operating points" or "points") vary from the curve fit, the TBC 4 can be configured to generate a new curve fit based on the new points. For example, the TBC 4 can be configured to determine an average error value by determining an error value for each new point (at block 232). Each error value is based on a difference between the new point and the existing curve fit. After a predetermined number of new points is acquired (e.g., 12 new points from a total of 21), the TBC 4 calculates an average error value by summing the individual errors (which can be positive or negative) and dividing the sum by the predetermined number of new point. If the average error value exceeds a predetermined threshold, the TBC 4 creates a new curve based on the new points. In addition to the new points, the TBC 4 can also use old points in creating the new curve and/or the slope and curvature of the previous curve fit (e.g., to limit the amount of change between curve fits). The number of points used to determine when to create a new curve can be selected based on an expected range of vehicle deceleration based on typical driver behavior (e.g., less than approximately 0.3 g). When the TBC 4 generates a new curve, the TBC 4 can delete or overwrite the existing curve fit (e.g., stored in the memory module 24) with the new curve. For example, in certain embodiments, the points and curve fit are stored in memory from ignition cycle to ignition cycle.

Of course a subset of vehicle operating points can be selected, for example, to avoid outliers, include operating points within a predetermined range of vehicle operating points, or for other reasons. In should also be understood that more than one braking event may be required to obtain a desired number of vehicle operating points. Thus, a first, second, third, etc. braking event may be required.

Figure 6:
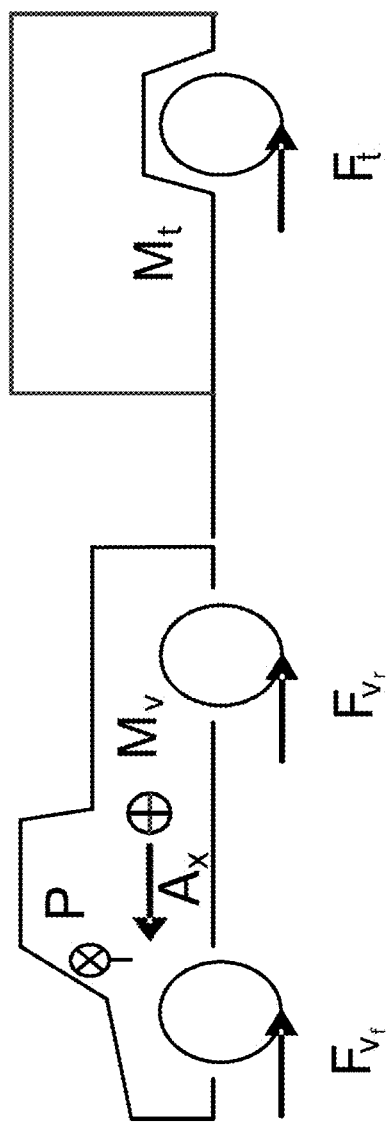
FIG. 6 is a free body diagram illustrating a stop force for a vehicle towing a trailer.
Figure 7:
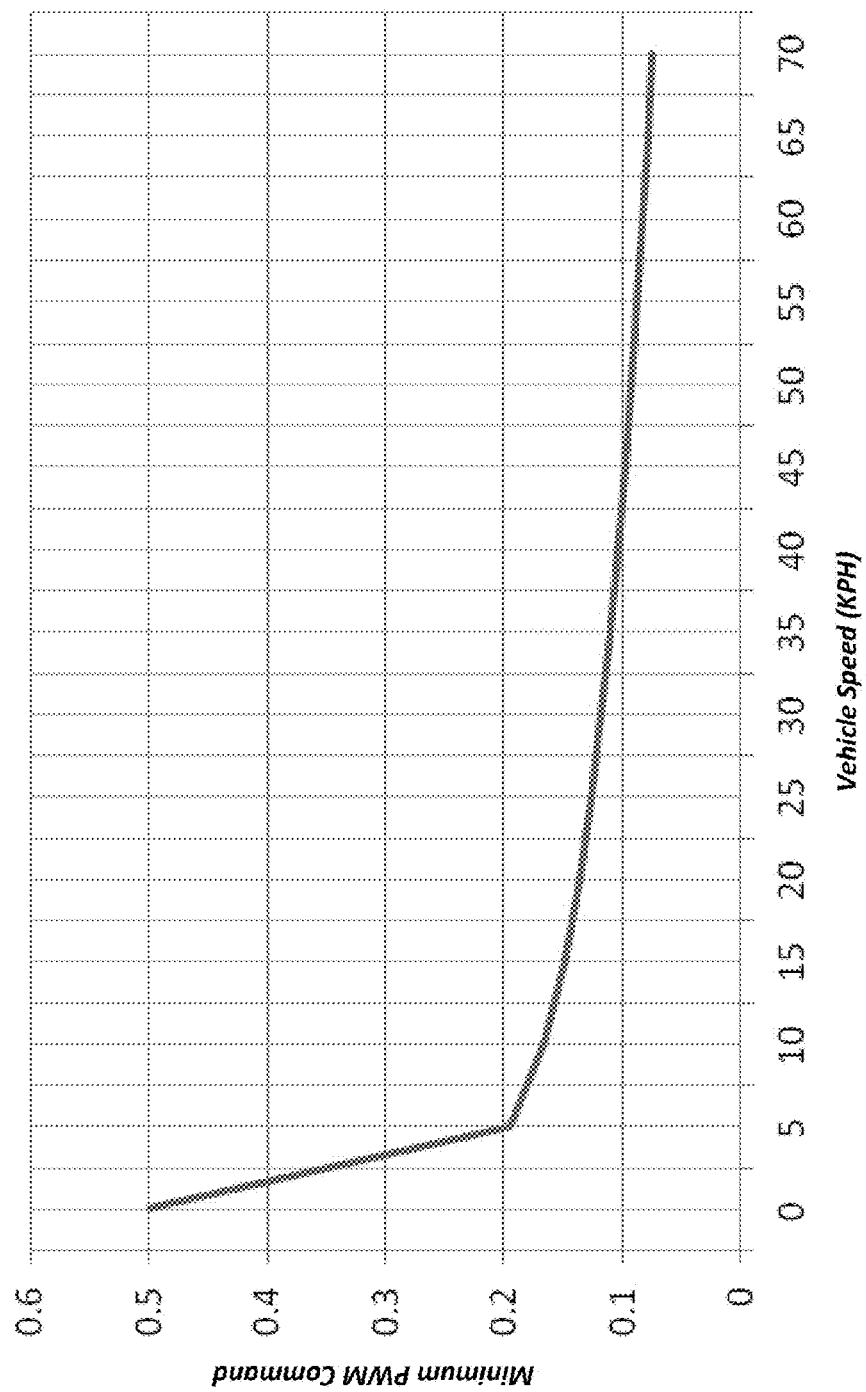
FIG. 7 is a graph illustrating a minimum command signal applied by the trailer brake controller of FIG. 1.

As shown in FIG. 6, when a trailer is connected to a vehicle, the force used to stop the total mass ($M_v + M_t$) is generated by the vehicle's braking system and the trailer's braking system. Depending on the ratio of $M_t$ and $F_t$, this may lead to a different value of $A_x$ for a given value of P. In other words, due to the mass and brake force of the trailer, when the driver applies the same amount of brake pressure with the trailer 10 connected, the vehicle 2 may not decelerate at the same rate as when the vehicle was not connected to the trailer 12. Existing trailer systems including electrical or hydraulic braking system are activated by an electrical signal that controls a current supplied to the braking system. The signal can be an analog, pulse-width-modulated ("PWM"), or other waveform signal. In existing trailer systems, the signal is based on the driver's requested braking force and a gain amount. The gain amount increases or decreases the driver's brake command to create an adjusted brake command for the trailer braking system. In existing systems, the gain amount was manually set by the driver and often required multiple trial and error adjustments to get the gain amount set to the proper amount. In general, the heavier the trailer relative to the trailer brake force, the higher the gain amount. Therefore, drivers often attempted to set the gain as high as possible without causing the trailer brakes to lock-up. In contrast, the TBC 4 automatically calculates a gain amount to account for the added mass and brake force of a connected trailer. In particular, the TBC 4 measures P, which determines the $F_{v_t} + F_{v_t}$. The TBC 4 uses the measured P to set the $F_t$ to keep the $A_x$ for the measured P the same as when the trailer was not connected to the vehicle as defined in the learned relationship.

For example, the TBC 4 is configured to detect when the trailer 10 is connected to the vehicle 2 (at block 233). As noted above, the TBC 4 can monitor a PWM output current from the trailer braking system 12 through the input ports 26. After the trailer 10 is electrically attached to the vehicle 2, the TBC 4 will detect a high PWM output current when the driver applies the vehicle's brakes. When the TBC 4 detects that the trailer 10 is connected to the vehicle 2, the TBC 4 can communicate with the instrument cluster 16 (e.g., over the CAN bus 8) to inform the driver of the connection.

When the trailer 10 is connected to the vehicle 2, the TBC 4 is configured to select an automatic gain amount (at block 234) based on the learned relationship between $A_x$ and P. In particular, when the trailer is connected to the vehicle 10 while the vehicle 2 is being driven, the TBC 4 reads $A_x$ values and P values as described above. When a minimum predetermined number of points have been recorded (e.g., 12 points), the TBC 4 uses the new points to determine an average error value for the learned relationship caused by the trailer 10 (i.e., how much $A_x$ has changed for a given P given the added weight and brake force of the trailer 10). In particular, the TBC 4 determines the difference between the old curve fit and the new points. For example, FIG. 5 illustrates original curve fit 213b measured when a vehicle is not towing a trailer and new $A_x$ and P readings illustrated by line 213c measured when the vehicle is towing a trailer. FIG. 5 also illustrates a difference 213d between the old curve fit and each new point. The TBC 4 uses the sum of the differences 213d divided by the number of new points to calculate a the average error value. The TBC 4 uses the average error value to automatically select a trailer brake gain. For example, in some embodiments, the higher the error value, the higher the TBC 4 sets the gain. Also, in some embodiments, a positive error value results in a positive gain adjustment and a negative error value results in a negative gain adjustment. The TBC 4 can use a table to map the average error value to a particular gain value. The relation between the error value and the gain adjustment can be set during a calibration process for the TBC 4. It should be understood that before the TBC 4 has acquired the minimum predetermined number of new points to calculate the average error value, the TBC 4 can select a default gain amount. The default gain amount can be a predetermined amount, the last gain amount selected by the TBC 4, or the previous gain amount stored in memory if the trailer is still connected to the vehicle.

In addition to using the average error value to automatically calculate the gain amount, the TBC 4 also uses the average error value to determine if a new curve fit should be generated. For example, as described above, if the error value exceeds a predetermined threshold, the TBC 4 creates a new curve based on the new points (see, e.g., line 213e illustrated in FIG. 5). The new curve point includes the new points and, may be influenced by old points. As noted above, the number of points used to determine when to create a new curve can be selected based on an expected range of vehicle deceleration based on typical driver behavior (e.g., less than approximately 0.3 g).

Accordingly, while the vehicle 2 is connected to the trailer 10, the TBC 4 automatically generates a gain amount based on a difference between a measured $A_x$ for a given P and the curve fit of a previously-measured $A_x$ for the same P when the vehicle 2 was not connected to the trailer 10 (i.e., the $A_x$ associated with the given P according to the curve fit). Furthermore, the TBC 4 generates new curve fits based on the differences to continually adjust the gain and subsequently, the brake command issued for the trailer braking system 12. Therefore, unlike existing trailer controller that require a user to manually set and adjust (through trial and error) the gain amount, the TBC 4 automatically selects a gain value based on the learned pressure/acceleration relationship and how the relationship changes after the trailer 10 is connected to the vehicle 2.

In some embodiments, as illustrated in FIG. 3b, the TBC 4 modifies the automatic gain to account for a current incline (i.e., positive or negative incline) of the road. In particular, the TBC 4 reads an acceleration sensor (e.g., through the CAN bus 8) (at block 236) and compares the value from the acceleration sensor to the estimated vehicle acceleration (at block 208) to determine a road incline (at block 238). In some embodiments, TBC 4 quantifies the road incline by selecting a road incline level from a plurality of levels or ranges. For example, the TBC 4 may determine that the road incline is "level 1" if the difference between the acceleration values is approximately 1.0 m/s² or less, "level 2" if the difference between the acceleration values is between approximately 1.0 m/s² and approximately 2.0 m/s², or "level 3" if the difference between the acceleration values is between approximately 2.0 m/s² and approximately 3.0 m/s². The selection of these exemplary thresholds is typically done during a calibration process. The TBC 4 uses the determined road incline to modify the previously-selected automatic gain, such as by increasing the gain amount when the vehicle 2 is on a decline and decreasing the gain amount when the vehicle 2 is on an incline (at block 240).

The TBC 4 then uses the modified automatic gain to calculate an automatic brake command (at block 242). The automatic brake command is a command signal for the trailer braking system 12. The command signal can include, for example, analog signals, pulse-width-modulated ("PWM") signals, or both. The command signal instructs or controls the trailer braking system 12 to apply a particular amount of braking to the trailer 10. In some embodiments, the TBC 4 adjusts the trailer brake force ($F_t$) that is commanded of the trailer braking system 12 by adjusting the duty cycle of a PWM command signal transmitted to the braking system 12. For example, a 100% duty cycle causes the trailer braking system 12 to apply a maximum braking force. Alternatively, a 1% duty cycle causes the trailer braking system 12 to applying a minimum braking force. Accordingly, the TBC 4 can adjust the duty cycle of the PWM command signal using the following equation:

$$PWM_{output} = gain*(brake\ pressure/maximum\ brake\ pressure)$$

Where "gain" is the automatically-selected (and, optionally modified) gain value (from block 234 and 240), "brake pressure" is the pressure measured by the TBC 4 (from block 210), and "maximum brake pressure" is the maximum pressure that the driver can create through activation of the brake pedal, which is a system design parameter.

After calculating the automatic brake command, the TBC 4 limits the automatic brake command (at block 250) during braking. In some embodiments, the TBC 4 limits the automatic brake command by setting a minimum trailer braking control value ("MTBCV").

In particular, as noted above, the command signals sent to the trailer braking system 12 are related to the pressure measured at the master cylinder of the vehicle 2, which is set based on the driver's pressure applied to the brake pedal. However, when the driver applies low master cylinder pressure, the trailer 12 may be "loose" to move forward and back relative to the motion of the vehicle 2 because a low level of braking is commanded of the trailer braking system 12. Although this situation occurs at all speeds when low master cylinder pressure is applied, it is most noticeable at low vehicle speeds. Accordingly, the TBC 4 can be configured to determine a MTBCV (e.g., a minimum PWM command) regardless of the current vehicle speed when the vehicle brakes are applied. By determining the MTBCV at all speeds whenever the brake is applied, the MTBCV can be used to keep a residual force on the trailer brakes regardless of the pressure applied by the driver's foot.

In particular, in one embodiment, the following equation describes the MTBCV:

$$MTBCV = R1 - \sqrt[3]{(VehicleSpeed)}/R2.$$

In the above equation, "R1" is a real number less than 1.0 and "R2" is a real number greater than 1.0. R1 relates to the root of the equation. Since root 3 is used in the particular example provided, R1 is approximately 0.5 and R2 is approximately 4.0. More broadly speaking, R1 is an asymptotic value of the Cth root of the vehicle speed and R2 can be set through calibration. FIG. 8 is a graph displaying the relationship between vehicle speed and the MTBCV according to the above equation using the foregoing values of R1, C, and R2 when plotted at 5 kilometers per hour ("KPH") increments. Values for R1, C, and R2 can be predetermined to produce a desired minimum PWM command profile over the entire speed range. For example, R1 can be set to limit a maximum value of the minimum PWM command at vehicle speeds near zero. C can be set to control an amount of change in slope of the minimum PWM command profile over a vehicle speed range. R2 can be set to further control a slope of the minimum PWM command profile or aggressiveness at lower vehicle speeds. Values for R1, C, and R2 can be set to control a minimum value (or offset from zero) of the minimum PWM command at higher vehicle speeds.

It should be understood that a control value broadly refers to the MTBVC as well as other tendency measures such as median, mode, and averages and the like which may be used in certain alternative embodiments.

After calculating the MTBCV, the TBC 4 compares the MTBCV to the automatic brake command. If the automatic brake command is less than the MTBCV, the TBC 4 limits the automatic brake command by setting the automatic brake command to the MTBCV (at block 250). Accordingly, the MTBCV ensures an adequate amount of trailer braking at any vehicle speed to prevent unwanted fore/aft undulation.

Alternatively or in addition, the TBC 4 can limit the automatic brake command by determining a maximum trailer braking command. The maximum trailer braking command can be set based on the coefficient of friction. For example, the TBC 4 can access a table that maps a coefficient of friction to a particular maximum PWM command. The relationship between the coefficient of friction and the maximum PWM command can be set during calibration of the TBC 4. If the automatic brake command is greater than the maximum PWM command, the TBC 4 can be configured to set the automatic brake command to the maximum command. Accordingly, the maximum command limits the amount of trailer braking to prevent a lock-up or skidding situation.

The TBC 4 uses the limited automatic brake command to select a final brake command for the trailer braking system 12 (at block 260). As illustrated in FIG. 3c, the final command selected by the TBC 4 can also be based on whether the vehicle is traveling forward or in reverse. For example, in some embodiments, the TBC 4 only sends commands to the trailer braking system 12 when the vehicle 2 is traveling forward. Accordingly, the TBC 4 can be configured to read data from the CAN bus 8 that indicates a current gear selection of the vehicle 2 (e.g., forward, reverse, neutral, etc.) (at block 262).

The selected command can also be based on manual brake adjustments set through the user interface device 34. For example, the TBC 4 can be configured to determine a braking level set by the user through the manual brake lever 38 (at block 264) and a gain adjustment set by the user through the gain adjustment buttons 36a and 36b (at block 266). Based on these manual settings, the TBC 4 can calculate a manual brake command (at block 268). The TBC 4 can calculate the manual brake command using the $PWM_{output}$ equation described above. The trailer brake gain amount is set based on the user-selected gain amount and/or the user-selected brake level set through the user interface device 34. In some embodiments, the user-selected gain amount is adjusted before being used in the equation. For example, the user-selected gain amount can be divided by a predetermined factor (e.g., 10) before being applied by the TBC 4 using the above $PWM_{output}$ equation.

After determining the manual brake command, the TBC 4 compares the manual brake command to the automatic brake command. For example, if the manual brake command is greater than automatic brake command, the TBC 4 selects the manual brake command as the final command (at block 260). Alternatively, if the automatic brake command is greater than the manual brake command, the TBC 4 selects the automatic brake command as the final command (at block 260). After the final braking command is selected, the TBC 4 outputs the command to the trailer braking system 12 using the output circuit 28. As noted above, the command signals instruct the trailer braking system 12 to apply a particular amount of braking to the trailer 10. Also, in some embodiments, the TBC 4 uses the difference between the manual brake gain and the automatic brake gain to amplify or diminish the calculation of the average error value described above. For example, a positive error in the gain difference will increase the average gain error. And, a negative error in the gain difference will decrease the average gain however. This relationship is configured at the time of application.

Accordingly, by using the learned relationship between brake pressure and vehicle acceleration when the vehicle is not towing a trailer, the TBC 4 commands the trailer braking system 12 to brake the trailer 10 such that the driver of the vehicle 2 can continue to operate the vehicle 2 as if the trailer 10 were not connected. Therefore, the driver does not need to drastically adjust his or her operation of the vehicle 2 (e.g., braking pressure applied) when the trailer 10 is connected to the vehicle, which increases the driver's ease of operation and comfort. Furthermore, the driver does not need to manually set the gain amount through trial and error because the TBC 4 automatically selects a gain amount based on the previously-learned relationship.

Figure 8A:
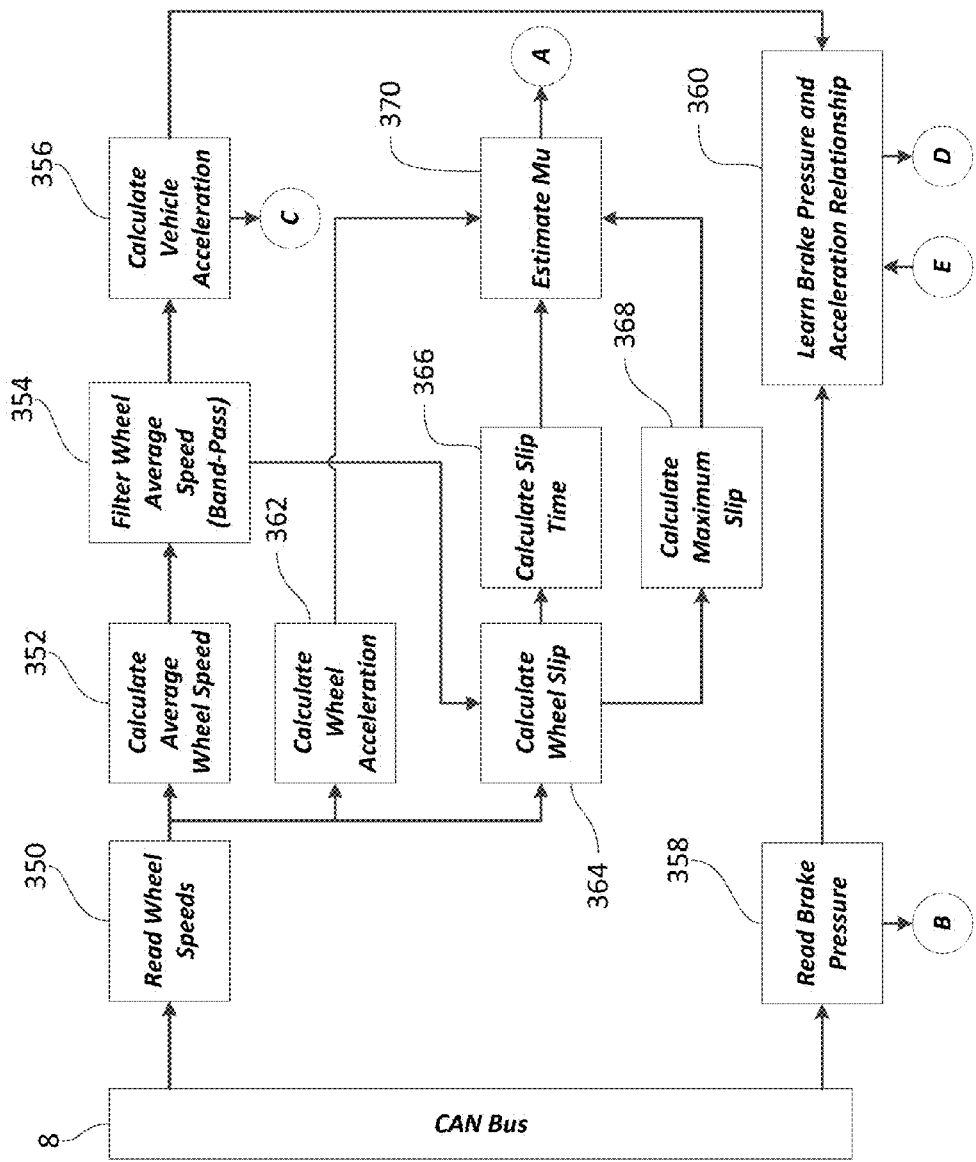
FIGS. 8a and 8b are flowcharts illustrating an alternative method of controlling the brakes of a trailer using the trailer brake controller of FIG. 1.
Figure 8B:
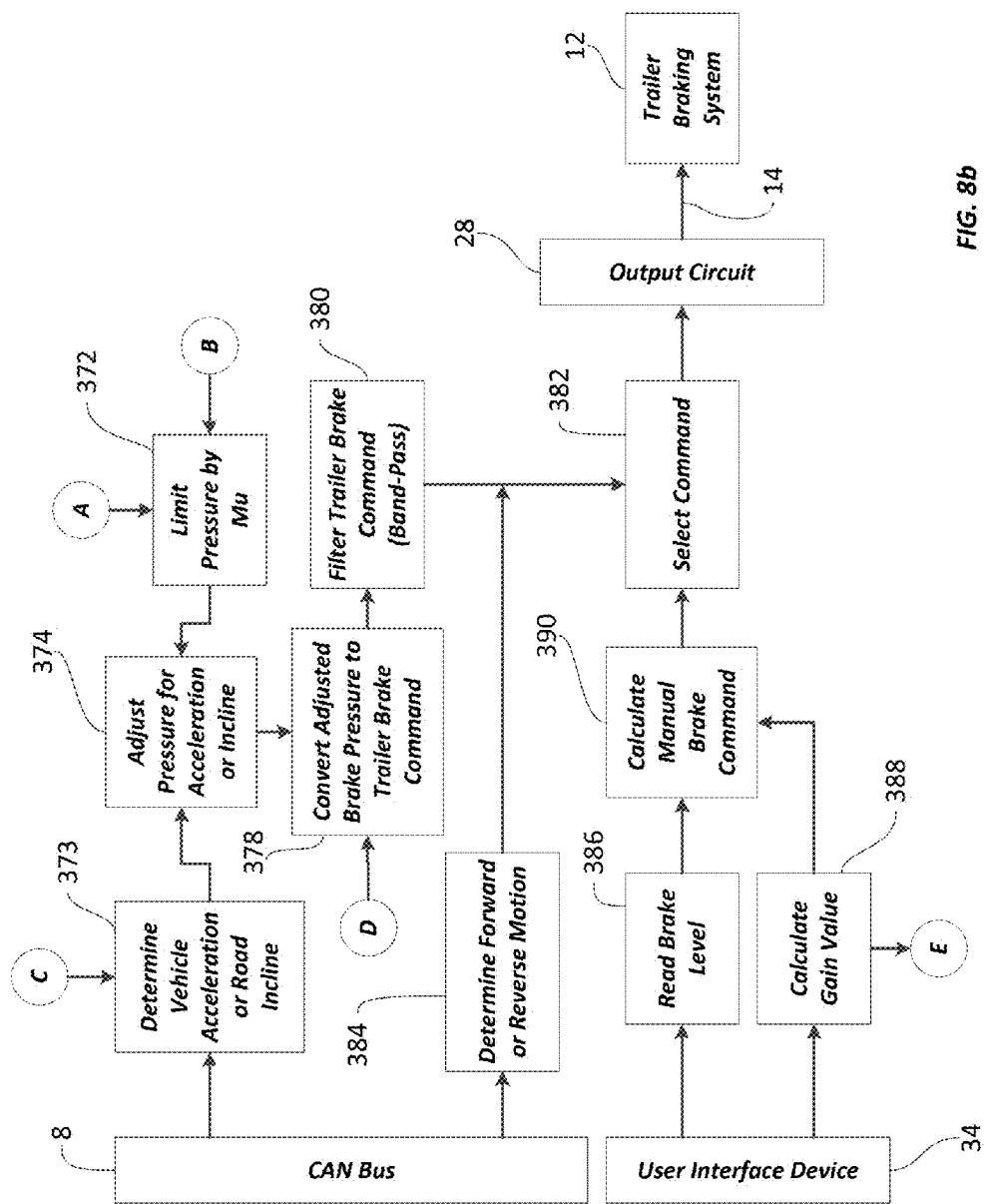

FIGS. 8a and 8b illustrate an alternative method performed by the TBC 4. As illustrated in FIG. 8a, in this embodiment, the TBC 4 obtains current wheel speeds from the CAN bus 8 (at block 350). The TBC 4 uses the received wheel speeds to calculate an average wheel speed (at block 352). The TBC 4 also filters the average wheel speed, such as by applying a band pass filter (before or after calculating an average wheel speed) (at block 354). Based on the filtered average wheel speed, the TBC 4 calculates vehicle acceleration (at block 356).

The TBC 4 also reads a current brake pressure from the bus 8 (at block 358). The TBC 4 uses the vehicle acceleration and the brake pressure to learn a relationship between brake pressure and vehicle acceleration as described above (at block 360). As illustrated in FIG. 8a, the TBC 4 also calculates a wheel acceleration using the filtered average wheel speed (at block 362). Furthermore, the TBC 4 calculates a wheel slip using the wheel speeds and the average filtered wheel speeds (at block 364). The TBC 4 uses the calculated wheel slip to determine a wheel slip time or period and a maximum wheel slip amount (at blocks 366 and 368, respectively). The TBC 4 uses wheel acceleration, wheel slip, slip time, and maximum slip amount to estimate a coefficient of friction (i.e., a "mu" value) (at block 370). The TBC 4 uses the coefficient of friction to adjust command signals provided to the trailer braking system 12 to help keep the trailer 10 stable on slippery surfaces, such as ice or snow.

In particular, the TBC 4 reads a current brake pressure (at block 358) from the bus 8 and adjusts or limits the current brake pressure by the coefficient of friction (at block 372). The adjusted brake pressure is also further adjusted for a road incline. For example, the TBC 4 can be configured to determine a road incline based on a comparison of the calculated vehicle acceleration (see block 356) and a measured acceleration read from the CAN bus 8 (at block 373). The TBC 4 adjusts the brake pressure (already adjusted for the coefficient of friction) based on the determined road incline (at block 374). In particular, the TBC 4 uses the road incline to increase or decrease the braking pressure when the trailer 10 is on a non-level surface. Accordingly, by adjusting trailer braking based on road incline, the TBC 4 instructs the trailer braking system 12 to provide an appropriate amount of braking force when the trailer 10 is on an inclined or declined surface.

After adjusting the brake pressure based on the coefficient of friction and the road incline, the TBC 4 converts the adjusted brake pressure to a trailer brake command based on the previously-learned relationship between brake pressure and vehicle acceleration (at block 378). In some embodiments, the TBC 4 filters the generated trailer brake command, such as with a band-pass filter (at block 380). The TBC 4 then selects a final command to output to the trailer braking system 12 (at block 382) based on the generated trailer brake command.

As illustrated in FIG. 8b, the command selected by the TBC 4 can be based on whether the vehicle is traveling forward or in reverse (at block 384). For example, in some embodiments, the TBC 4 only sends commands to the trailer braking system 12 when the vehicle 2 is traveling forward. Accordingly, the TBC 4 can be configured read data from the CAN bus 8 that indicates a current gear selection of the vehicle 2 (e.g., forward, reverse, neutral, etc.).

The selected command can also be based on manual brake adjustments set through the user interface device 34. For example, the TBC 4 determines a braking level set by the user through the manual brake lever 38 (at block 386) and a gain adjustment set by the user through the gain adjustment buttons 36a and 36b (at block 388). Based on these manual settings, the TBC 4 calculates a manual brake command (at block 390) and uses the manual brake command to select the final command for the trailer braking system 12 (at block 382). After the final braking command is selected (at block 382), the TBC 4 outputs the command to the trailer braking system 12 using the output circuit 28.

Figure 9A:
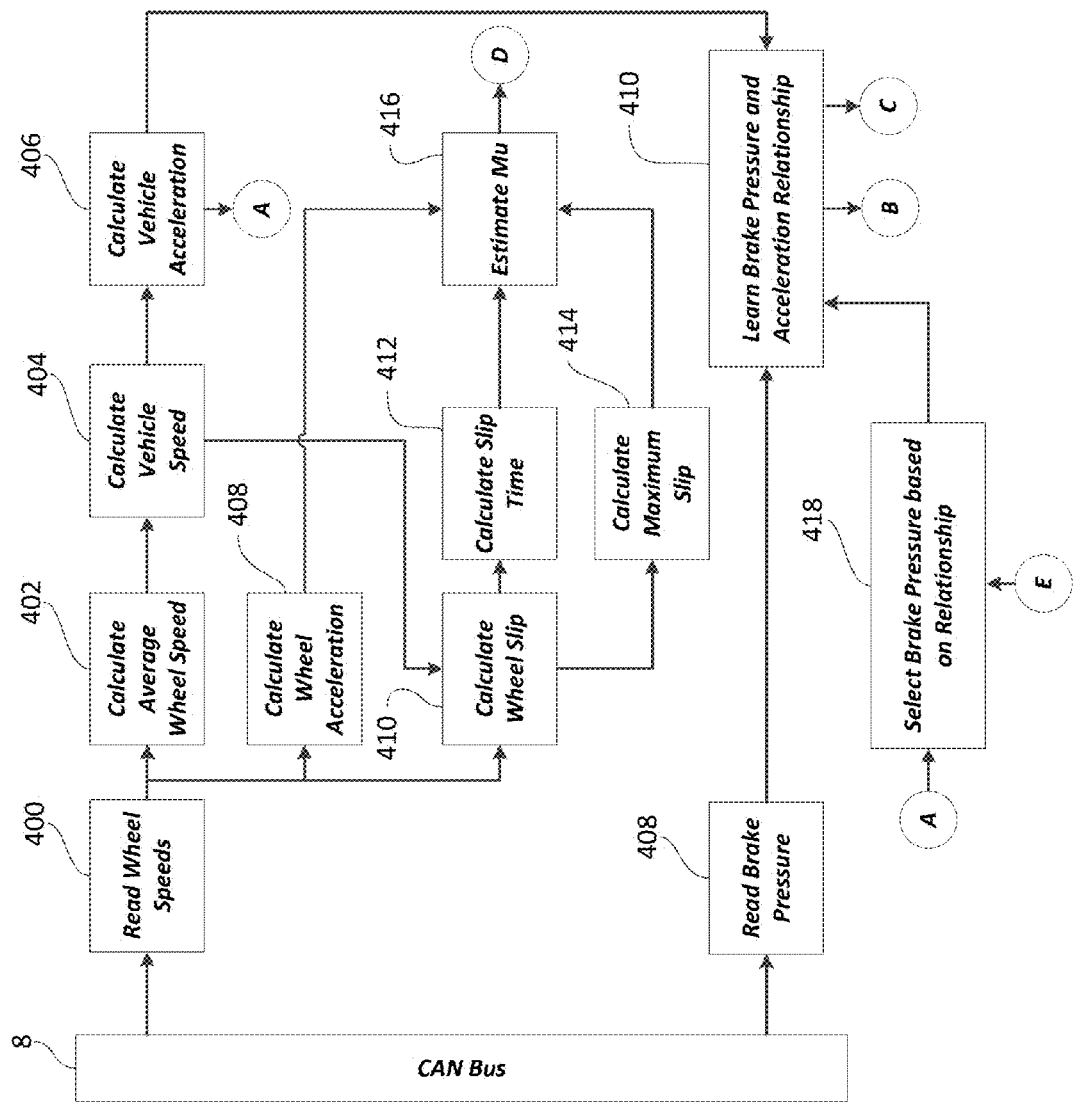
FIGS. 9a and 9b are flowcharts illustrating another alternative method of controlling the brakes of a trailer using the trailer brake controller of FIG. 1.
Figure 9B:
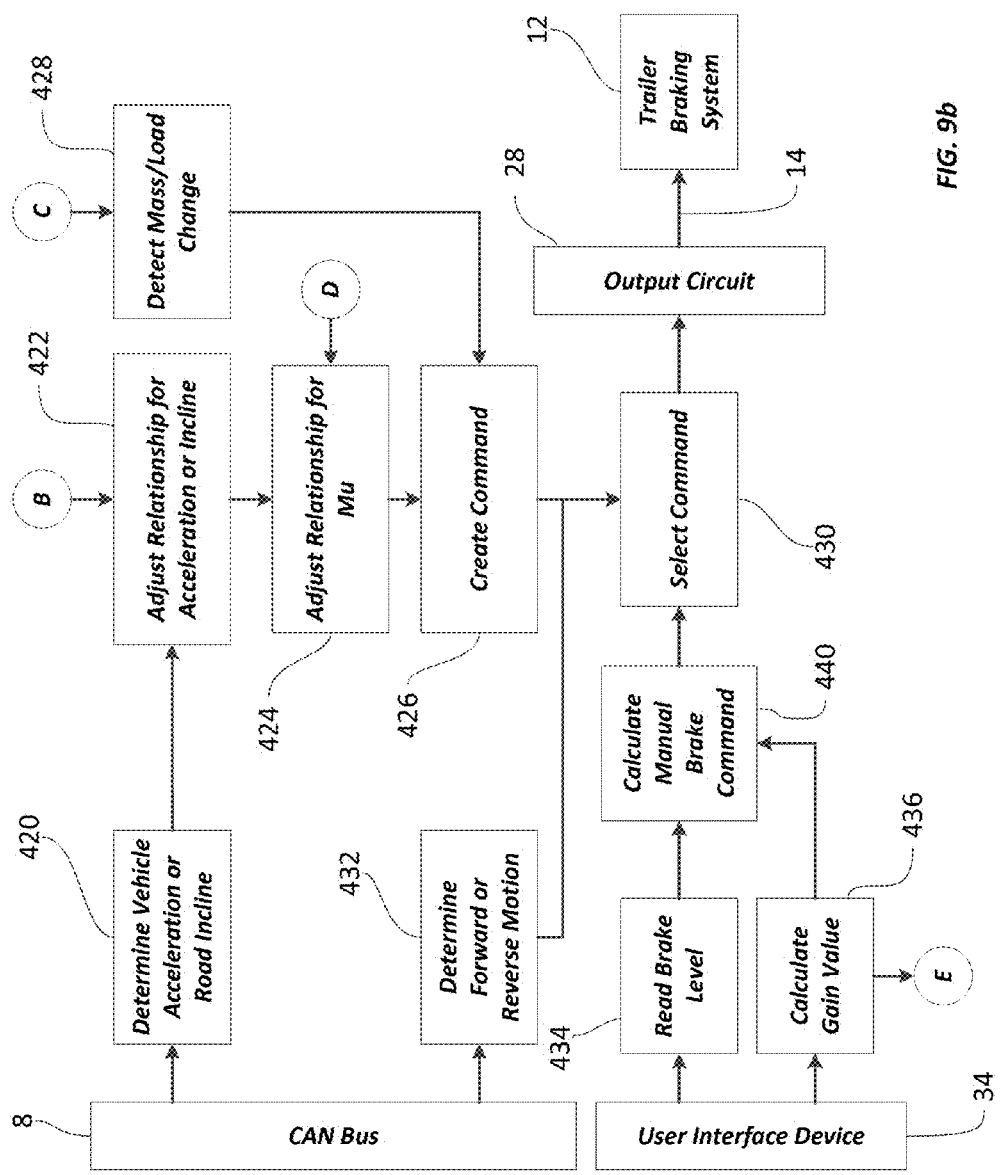

FIGS. 9a and 9b illustrate another alternative method performed by the TBC 4. In the method illustrated in FIGS. 9a and 9b, the driver selects a relationship of brake pressure and vehicle deceleration for a given weight range. For the corresponding weight range, the TBC 4 learns a relationship between the vehicle deceleration and brake pressure and modifies the relationship based on current road incline and friction. If the weight of the vehicle changes, the TBC 4 modifies the relationship and, ultimately, the trailer brake command output by the TBC 4.

In particular, as illustrated in FIG. 9a, the TBC 4 obtains current wheel speeds from the CAN bus 8 (at block 400). The TBC 4 uses the received wheel speeds to calculate an average wheel speed (at block 402). The TBC 4 uses the average wheel speed to calculate a vehicle speed (at 404) and uses the vehicle speed to calculate vehicle acceleration (at block 406). The TBC 4 also reads a current gain value from the user interface device 34 (at block 407).

The TBC 4 then adjusts the relationship based on the current driving conditions. In particular, the TBC 4 also calculates wheel acceleration (at block 411). Furthermore, the TBC 4 calculates a wheel slip using the wheel speeds and the calculated wheel speed (at block 412). The TBC 4 uses the calculated wheel slip to determine a wheel slip time or period and a maximum wheel slip amount (at blocks 413 and 414, respectively). The TBC 4 uses wheel acceleration, wheel slip, slip time, and maximum slip amount to estimate a coefficient of friction (i.e., a "mu" value) (at block 416). The TBC 4 uses the coefficient of friction to adjust the learned relationship (at block 417). Furthermore, the TBC 4 can be configured to determine a road incline based on data available over the CAN bus 8 (at block 420) and adjust the learned relationship based on the road incline (at block 422). The TBC 4 also adjusts the relationship (already adjusted for the road incline) based on the previously-determined coefficient of friction (at block 424).

After adjusting the relationship based on the road incline and the coefficient friction, the TBC 4 creates a trailer brake command based on the adjusted relationship (at block 426). As illustrated in FIG. 9b, in addition to creating the command based on the adjusted relationship, the TBC 4 also detects a change in mass or load of the vehicle 2 (at block 428) and uses the detected change in mass when creating the trailer brake command (at block 426). For example, as the $A_x$ values for a given P shift, a mass can be estimated that is causing the changing $A_x$ values. After creating the trailer brake command, the TBC 4 selects a final command to output to the trailer braking system 12 (at block 430) based on the created trailer brake command.

As illustrated in FIG. 9b, the command selected by the TBC 4 can be based on whether the vehicle is traveling forward or in reverse (at block 432). For example, in some embodiments, the TBC 4 only sends commands to the trailer braking system 12 when the vehicle 2 is traveling forward. Accordingly, the TBC 4 can be configured read data from the CAN bus 8 that indicates a current gear selection of the vehicle 2 (e.g., forward, reverse, neutral, etc.). The selected command can also be based on manual brake adjustments set through the user interface device 34. For example, the TBC 4 determines a braking level set by the user through the manual brake lever 38 (at block 434) and a gain adjustment set by the user through the gain adjustment buttons 36a and 36b (at block 436). Based on these manual settings, the TBC 4 calculates a manual brake command (at block 440) and uses the manual brake command to select the final command for the trailer braking system 12 (at block 430) as described above. After the final braking command is selected (at block 430), the TBC 4 outputs the command to the trailer braking system 12 using the output circuit 28.

Figure 10A:
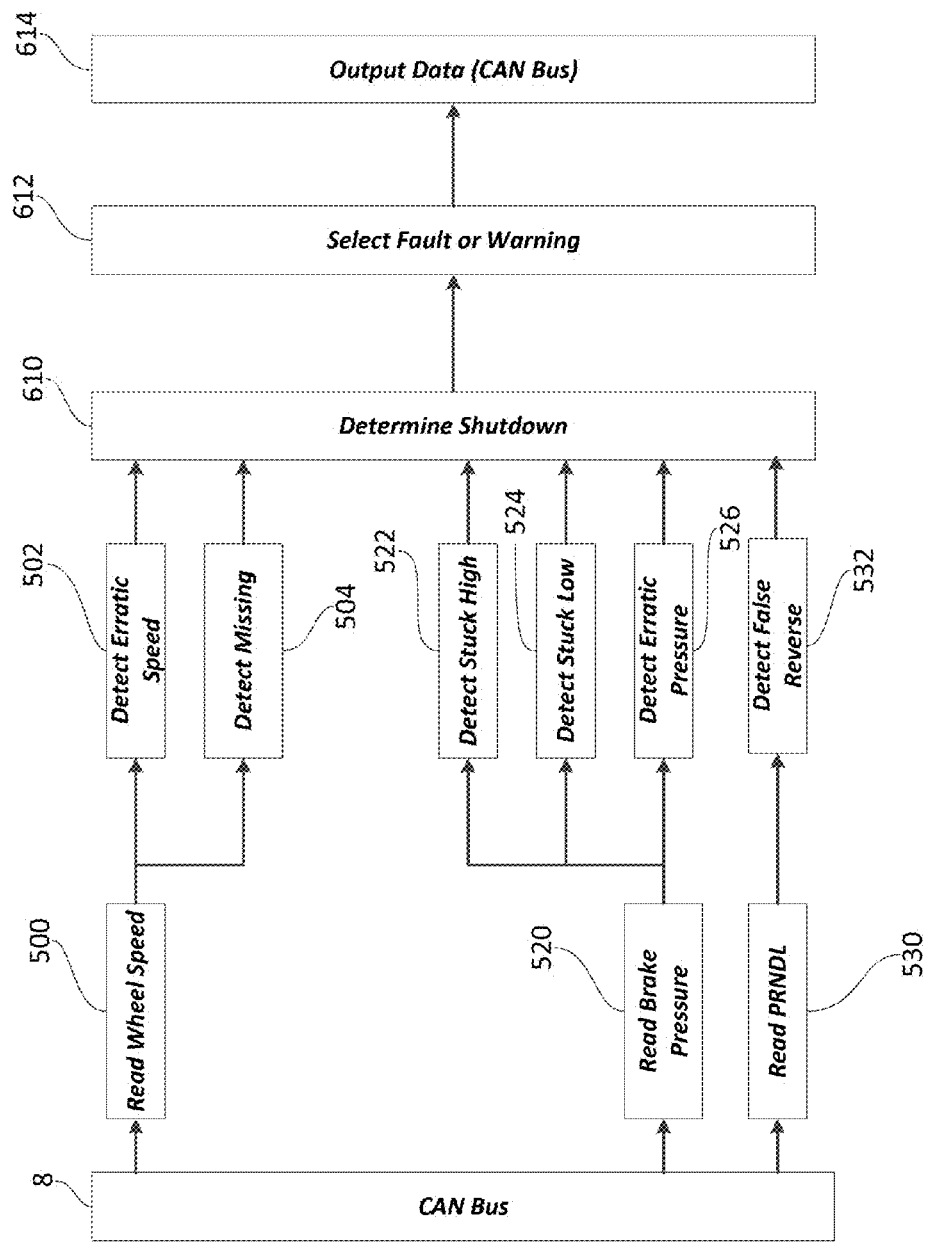
FIGS. 10a-c are flowcharts illustrating methods of monitoring operation of the trailer brake controller of FIG. 1.
Figure 10B:
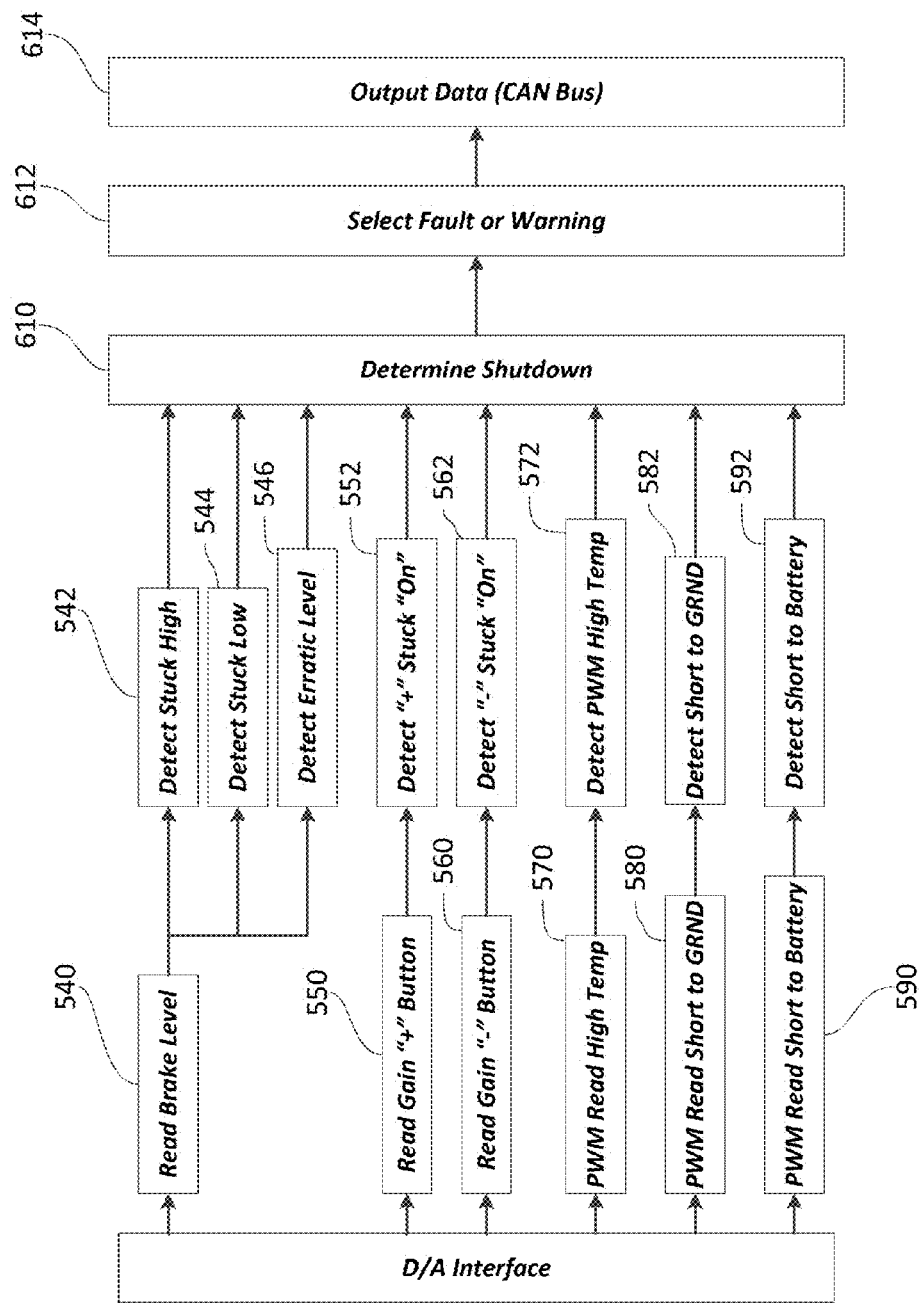
Figure 10C:
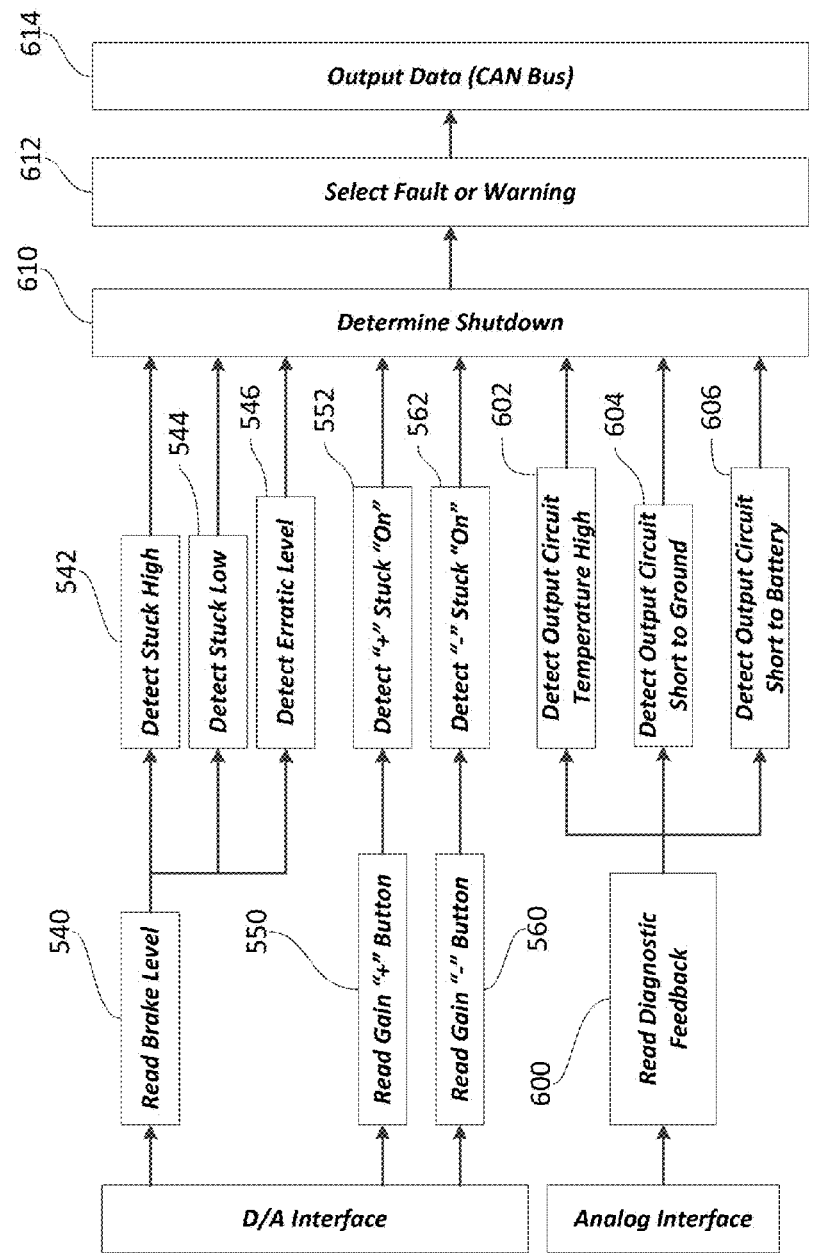

In some embodiments, the TBC 4 also monitors its performance and/or performance of the vehicle 2 to ensure that the TBC 4 is operating properly and/or that the data inputs to the TBC 4 (i.e., the output from various sensors) are correct. For example, FIGS. 10a-c illustrates methods performed by the TBC 4 to perform various monitoring. It should be understood that the monitoring illustrated in FIGS. 10a-c can be performed simultaneously with the trailer braking control performed by the TBC 4 as described above with respect to FIGS. 3a-c, 8a-b, and 9a-b. In other embodiments, the TBC 4 performs the monitoring at regular intervals and/or as an initial check when the TBC 4 is powered on.

To perform the monitoring, the TBC 4 reads particular data from the CAN bus 8. For example, as illustrated in FIG. 10a, the TBC 4 can read a wheel speed (at block 500) and use the wheel speed to detect erratic vehicle speed (at block 502) and/or to detect missing wheel speed information (at block 504). The TBC 4 can also read a brake pressure from the CAN bus 8 (at block 520). The TBC 4 can use the brake pressure to detect whether the brake pressure is stuck high (at block 522), stuck low (at block 524), or is erratic (at block 526). In addition, the TBC 4 can read a gear selection for the vehicle 2 (at block 530) (i.e., whether the vehicle 2 is in park, reverse, neutral, drive, or low). The TBC 4 can use the gear selection to detect a false reverse condition (e.g., detect when other parameters on the bus 8 indicate that the vehicle 2 is traveling in reverse when the vehicle 2 is not in the reverse gear) (at block 532).

As illustrated in FIG. 10b, the TBC 4 can also read the brake level from the user interface device 34 (at block 540). The TBC 4 can use the brake level to detect whether the level is stuck high (at block 542), stuck low (at block 544), or is performing erratically (at block 546). In addition, the TBC 4 can read the increase gain button 36a (at block 550) and detect whether the increase gain button 36a is stuck "on" (at block 552). Similarly, the TBC 4 can read the decrease gain adjustment button 36b (at block 560) and detect whether the decrease gain button 36b is stuck "on" (at block 562).

As part of the monitoring, the TBC 4 can also read one or more of the plurality of input ports 26. For example, the TBC 4 can monitor the PWM output current from the trailer braking system 12. In particular, the TBC 4 can read a PWM temperature signal (at block 570) and detect whether the PWM temperature exceeds a maximum threshold (at block 572). The TBC 4 can also read a short-to-ground signal (at block 580) to detect whether there is a ground short (at block 582). Similarly, the TBC 4 can read a short-to-battery signal (at block 590) to detect a battery short (at block 592). In some embodiments, as illustrated in FIG. 11c, rather than individually regarding signals regarding PWM temperature, short-to-ground, and short-to-battery signals as illustrated in FIG. 10b, the TBC 4 can read diagnostic feedback from the trailer braking system 12 (at block 600). The TBC 4 can use the feedback to detect a high temperature of the output circuit 28 (at block 602), detect an output circuit short-to-ground (at block 604), and detect an output circuit short-to-battery (at block 606).

As illustrated in FIGS. 10a-c, if the TBC 4 detects any of the faults, erroneous conditions, or unreliable condition, the TBC 4 takes various actions. For example, the TBC 4 can be configured to determine whether any detected errors (or a set of detected errors) require shutdown of the TBC 4 (at block 610). Additionally or in the alternative, the TBC 4 can also determine whether any detected errors (or a set of detected errors) require notification of the errors to the driver or other vehicle control systems (at block 612). If notification is required, the TBC 4 can output data to the CAN bus 8, which can be transmitted to other vehicle control system and/or to the instrument cluster 16 (at block 614).

Thus, embodiments of the invention provide a trailer brake controller and methods of operating the same. In particular, by monitoring performance of a vehicle when the vehicle is not towing a trailer, a relationship can be learned between brake pressure and vehicle acceleration. The learned relationship can be used when the vehicle is towing a trailer to control braking of the trailer to make operation of the vehicle, from the point of view of the driver, relatively the same regardless of whether the vehicle is towing a trailer. In particular, by detecting how a previously-learned relationship between measured vehicle acceleration ($A_x$) and measured brake pressure (P) differs when a trailer is connected to the vehicle, the trailer brake controller can automatically set a trailer brake gain value rather than requiring that the driver manually set the value through a time-consuming and inefficient try and error process.

It should also be understood that the alternative methods described in the present application can be combined in various configurations other than those explicitly described herein.

Various features of the invention are set forth in the following claims.

What is claimed is:

1. A trailer brake control method for a vehicle towing a trailer, comprising:
    determining a number (N) of vehicle operating points during a first braking event when the vehicle is not towing the trailer by
        determining, based on information from a brake sensor, N brake operating points, and
        determining, based on information from one of a speed sensor and an acceleration sensor, an acceleration operating point for each of the N brake operating points;
    determining, using a processing unit, a first relationship between brake pressure and vehicle acceleration based on the N vehicle operating points;
    determining a number (M) of vehicle operating points during a second braking event when the vehicle is towing the trailer by,
        determining, based on information from the brake sensor, M brake operating points, and
        determining, based on information from the one of the speed sensor and the acceleration sensor, an acceleration operating point at each of the M brake operating points;
    determining, based on information from the brake sensor, a current brake operating point;
    determining, using the processing unit, a trailer brake command signal based on at least the first relationship, the M vehicle operating points, and the current brake operating point; and
    controlling brakes of the trailer by transmitting the trailer brake command signal from the vehicle to the trailer.

2. The trailer brake control method of claim 1, wherein the number (N) of vehicle operating points during a first braking event is a predetermined number.

3. The trailer brake control method of claim 1, wherein the number (M) of vehicle operating points during a second braking event is a predetermined number.

4. The trailer brake control method of claim 1, further comprising:
    determining, using the processing unit, a number (P) of differences between the M vehicle operating points and the N vehicle operating points; and
    determining the trailer brake command signal based on the P differences.

5. The trailer brake control method of claim 1, wherein determining the first relationship includes determining a curve having a fit to the N vehicle operating points.

6. The trailer brake control method of claim 1, wherein determining the first relationship includes determining an Nth order curve having a fit to the N vehicle operating points, wherein N is an even integer greater than 2.

7. The trailer brake control method of claim 1, further comprising:
    determining, using a wheel speed sensor, an estimated acceleration operating point by determining a derivative of an output of the wheel speed sensor;
    measuring, using an accelerometer, a current acceleration operating point;
    determining a difference between the estimated acceleration operating point and the current acceleration operating point, wherein
    the determining the trailer brake command signal includes determining a difference level based on the difference and a plurality of predetermined acceleration ranges.

8. The trailer brake control method of claim 1, further comprising determining a coefficient of friction and adjusting the trailer brake command signal based on the coefficient of friction.

9. The trailer brake control method of claim 1, further comprising determining a minimum trailer brake control value based on a current vehicle speed and setting the trailer brake command to the minimum trailer brake control value when the trailer brake command is less than the minimum trailer brake control value.

10. The trailer brake control method of claim 1, further comprising determining a manual trailer brake command based on a manually-selected gain amount input by an operator and setting the trailer brake command to the manual trail brake command when the manual trailer brake command is greater than the trailer brake command.

11. The trailer brake control method of claim 1, wherein determining the first relationship includes selecting a subset of the N vehicle operating points.

12. The trailer brake control method of claim 1, further comprising:
    determining, based on information from the brake sensor and the speed sensor, a number N' of vehicle operating points during a third braking event when the vehicle is not towing the trailer, wherein
    determining the first relationship includes determining the first relationship based on the N' vehicle operating points.

13. The trailer brake control method of claim 3, further comprising
    storing the first relationship in a memory module;
    determining a sum of the P differences;
    determining an average difference by dividing the sum by P; and
    when the average difference is greater than a predetermined difference,
        determining, using the processing unit, a second relationship between driver brake pressure and vehicle acceleration based on the M vehicle operating points,
        overwriting the first relationship in the memory module with the second relationship, and
        determining the trailer brake command signal based on the second relationship.

14. The trailer brake control method of claim 4, further comprising:
    storing the first relationship in a memory module;
    determining a sum of the P differences; and
    when the sum is greater than a predetermined sum:
        determining, using the processing unit, a second relationship between driver brake pressure and vehicle acceleration based on the M vehicle operating points,
        overwriting the first relationship in the memory module with the second relationship, and
        determining the trailer brake command signal based on the second relationship.

15. The trailer brake control method of claim 5, wherein determining the trailer brake command signal includes determining a difference between each of P of the M vehicle operating points and the curve, P being an integer less than or equal to M.

16. The trailer brake control method of claim 5, wherein the curve is a second order curve.

17. The trailer brake control method of claim 15, wherein determining the trailer brake command signal includes:
    determining a gain amount based on the P differences; and
    determining a product by multiplying the gain by the current brake operating point.

18. The trailer brake control method of claim 17, wherein determining the gain amount based on the P differences includes:
- determining a difference control value based on the P differences; and
- accessing a look-up table mapping the difference control value to the gain amount.

19. The trailer brake control method of claim 17, wherein determining the trailer brake command signal includes (1) dividing the current brake operating point by a maximum brake operating point and (2) multiplying the result of step (1) by the gain amount.

* * * * *